(12) United States Patent
McFatrich et al.

(10) Patent No.: US 12,458,029 B2
(45) Date of Patent: Nov. 4, 2025

(54) METHODS AND COMPOSITIONS FOR IMPROVING SOYBEAN YIELD

(71) Applicant: NewLeaf Symbiotics, Inc., St. Louis, MO (US)

(72) Inventors: Charles Michael McFatrich, St. Louis, MO (US); Janne Kerovuo, St. Louis, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 807 days.

(21) Appl. No.: 17/633,600

(22) PCT Filed: May 22, 2020

(86) PCT No.: PCT/US2020/034235
§ 371 (c)(1),
(2) Date: Feb. 8, 2022

(87) PCT Pub. No.: WO2021/025751
PCT Pub. Date: Feb. 11, 2021

(65) Prior Publication Data
US 2022/0304310 A1    Sep. 29, 2022

Related U.S. Application Data

(60) Provisional application No. 62/884,423, filed on Aug. 8, 2019.

(51) Int. Cl.
| | | |
|---|---|---|
| *A01N 63/20* | (2020.01) | |
| *A01H 3/00* | (2006.01) | |
| *A01H 6/54* | (2018.01) | |
| *C12N 1/20* | (2006.01) | |
| *C12R 1/01* | (2006.01) | |

(52) U.S. Cl.
CPC ............ *A01N 63/20* (2020.01); *A01H 3/00* (2013.01); *A01H 6/542* (2018.05); *C12N 1/205* (2021.05); *C12R 2001/01* (2021.05)

(58) Field of Classification Search
CPC ..... A01N 63/20; C12R 2001/01; Y02E 50/30; A01H 6/542; A01H 3/00; C12N 1/205; Y02A 40/10
See application file for complete search history.

(56) References Cited

U.S. PATENT DOCUMENTS

| | | |
|---|---|---|
| 5,106,648 A | 4/1992 | Williams |
| 5,512,069 A | 4/1996 | Holland et al. |
| 8,181,388 B2 | 5/2012 | Berger |
| 9,181,541 B2 | 11/2015 | Bogosian |
| 9,845,462 B2 | 12/2017 | Bogosian |
| 10,098,353 B2 | 10/2018 | Breakfield et al. |
| 10,111,438 B2 | 10/2018 | Floro et al. |
| 10,212,939 B2 | 2/2019 | Floro et al. |
| 10,287,544 B2 | 5/2019 | Bogosian |
| 10,368,547 B2 | 8/2019 | Floro et al. |
| 10,448,645 B2 | 10/2019 | Breakfield et al. |
| 11,284,622 B2 * | 3/2022 | Rioux ................. A01N 43/80 |
| 11,930,822 B2 * | 3/2024 | Rioux ................. A01P 3/00 |
| 2013/0324407 A1 * | 12/2013 | Bogosian .............. C12N 1/20 435/177 |
| 2016/0295868 A1 | 10/2016 | Jones et al. |
| 2016/0302423 A1 | 10/2016 | Jones et al. |
| 2017/0086464 A1 | 3/2017 | Floro et al. |
| 2017/0135352 A1 | 5/2017 | Breakfield et al. |
| 2017/0164618 A1 | 6/2017 | Breakfield et al. |
| 2017/0238553 A1 | 8/2017 | Jones et al. |
| 2018/0295841 A1 | 10/2018 | Rioux |
| 2019/0364905 A1 | 12/2019 | Rioux et al. |

FOREIGN PATENT DOCUMENTS

| | | |
|---|---|---|
| WO | 2013181610 A1 | 12/2013 |
| WO | 2014194189 A1 | 12/2014 |
| WO | 2018106899 A1 | 6/2018 |
| WO | 2020010264 A1 | 1/2020 |

OTHER PUBLICATIONS

Altschul S.F., et al., "Basic Local Alignment Search Tool," 1990, J Mol Bio, 215:403-410, 8 pages.
Bentley D.R., et al., "Accurate Whole Human Genome Sequencing Using Reversible Terminator Chemistry," 2008, Nature, 456:53-59, 7 pages.
Caporaso J.G., et al., Ultra-High-Throughput Microbial Community Analysis on the Illumina HiSeq and MiSeq Platforms, 2012, ISME J, 6:1621-1624, 4 pages.
Comai L., et al, "An altered aroA Gene Product Confers Resistance to the Herbicide Glyphosate," 1983, Science, 221/(4608): 370-371, 3 pages.
Green, P.N., et al., "Review of the Genus *Methylobacterium* and Closely Related Organisms: a Proposal that Aome *Methylobacterium apecies* be Reclassified into a New Genus, *Methylorubrum* gen. nov.," 2018, Iont J Syst Eval Microbiol, 68:2727-2748, 22 pages.
Han, N., et al., "ANItools Web: A Web Tool for Fast Genome Comparison Within Multiple Bacterial Strains," 2016, Database, 1-5, 5 pages.
Jain, C., et al., "High Throughput ANI Analysis of 90K Prokaryotic Genomes Reveals Clear Species Boundaries," 2018, Nature Communications, 9:5114, www.nature.com/naturecommunications, 8 pages.
Konstantinidis, K.T., et al., "Genomic Insights that Advance the Species Definition for Prokaryotes," 2005, PNAS, 102/7:2567-2572, 6 pages.
Koressaar, T., et al., "Primer3_Masker: Integrating Masing of Template Sequence with Primer Design Software," 2008, Bioinformatics, 34/11:1937-1938, 2 pages.
Lidstrom, M.E., "Chapter 1.20. Aerobic Methylotrophic Prokaryotes," The Prokaryotes. A Handbook on the Biology of Bacteria. Third edition. vol. 2. Ecophysiology and Biochemistry, 2006, In Dworkin, M., S. Falkow, E. Rosenberg, K.-H. Schleifer, and E. Stackebrandt (eds.), Springer, New York. pp. 618-634, 66 pages.

(Continued)

*Primary Examiner* — Ali Soroush
*Assistant Examiner* — Andriae M Holt
(74) *Attorney, Agent, or Firm* — Stinson LLP

(57) ABSTRACT

The present disclosure provides yield enhancing compositions comprising *Methylobacterium*, methods for improving soy bean yield, and methods of making the compositions. Also provided are isolated soybean yield enhancing *Methylobacterium*.

15 Claims, No Drawings
Specification includes a Sequence Listing.

(56) References Cited

OTHER PUBLICATIONS

Nleya, T., et al., "Soybean Production Handbook, Chapter 3: Soybean Growth Stages," 1997, www.iGrow.org, (Link no longer available: extension.agron.iastate.edu/soybean/production_growthstages.html), 11 pages.
Pederson, P., "Soybean Growth and Development," 2016, Iowa State University Extension, www.soybeanmanagement.info, 27 pages.
Sanger, F., et al., "DNAS sequencing with Chain-Terminating Inhibitors," 1977, PNAS USA, 74/12:5463-5467, 5 pages.
Sy, A., et al., "Methylotrophic *Methylobacterium* Bacteria Nodulate and Fix Nitrogen in Symbiosis with Legumes," 2001. J Bacteriol, 183/1:214-220, 7 pages.
Untergasser, A., et al., "Primer3—New Capabilities and Interfaces," 2012, Nuc Acids Res, 40/15:e115, https://academic.pup.com/nar/article/40/15/3115/1223759, 12 pages.
Vogel, H.J., et al., "Acetylornithinase of *Escherichia coli*: Partial Purification and Some Properties," 1956, J Biol Chem, 218:97-106, 11 pages.
Whittenbury, R., et al., "Enrichment, Isolation and Some Properties of Methane-Utilizing Bacteria," 1970, J Gen Microbiol, 61:205-218, 17.
International Preliminary Report on Patentability issued in PCT/US2020/034235, mailed Feb. 17, 2022, 10 pages.
International Search Report and Written Opinion issued in PCT/US2020/034235, mailed Oct. 16, 2020, 14 pages.

* cited by examiner

SEQUENCE LISTING

```
<160> NUMBER OF SEQ ID NOS: 79

<210> SEQ ID NO 1
<211> LENGTH: 300
<212> TYPE: DNA
<213> ORGANISM: Methylobacterium

<400> SEQUENCE: 1
ctcaacgttg ccgccttaac cgaagactaa ctaacataaa tttcagttag ccgcgaaaca      60
gaatatgata cttggtctta tacgacgcat agaggcgcat tccgtcaagt cgcgcattgc     120
agagtccccc cgaaaattcg ttttctggga gcgagcagaa acgtgtgcac gtgttctgtc     180
actctatttt ctggtttaga gcaatcatct cgcggctcag atcccgtcgt tccatagagt     240
ggtttccggt tcagtatgaa ttgtgagcag cccctgcggc tatatctact tcgacgtata     300

<210> SEQ ID NO 2
<211> LENGTH: 300
<212> TYPE: DNA
<213> ORGANISM: Methylobacterium

<400> SEQUENCE: 2
accaacaggc agaagaggct tacaaaaatg ctctagatat ctataatcgc gccggtctgg      60
ataataggcg ggaaaagtca aatattctta tcggacttgg cgatgcagct agcgcactga     120
gcaaatttat agacgcgaaa aatttctaca gtgaaggttt agcagtccga gcgcggtcat     180
gacggtgctt gcggactagt gtctgctcgc aattcagagc agccgcttcg gctggttcag     240
tttgggtatg ccctttctgt accagcctgt gactggtctg gtatgtagcc cttgaccaat     300

<210> SEQ ID NO 3
<211> LENGTH: 300
<212> TYPE: DNA
<213> ORGANISM: Methylobacterium

<400> SEQUENCE: 3
atgaagctcc gtcgtgttta tgtaaagaac gttcgcagtt tctacgatgc tgaagaactc      60
attctggacg gagatatttc tattattata ggcccaaatg gtggaggaaa aacaaatcta     120
cttgatgcga cgatacactt gttgagaaga catttattgc aatcgtgggc tgtcgttcgc     180
catacataca cgccaataaa ctattccgat cacttccaac caaatgatca aatcacaaac     240
tatgcgctgg agaagtacag cggtcgcgaa agcgaagacc aagtcgttga gttcgatatc     300

<210> SEQ ID NO 4
```

```
<211> LENGTH: 300
<212> TYPE: DNA
<213> ORGANISM: Methylobacterium

<400> SEQUENCE: 4 cggggggcggt ctcctcatat atggagggaa ttaatctgaa gggtcggagc ccccgctacg    60
gcacacacac ggcggcgggc ggtgggctcc ttcctcatat acgcttcctg ataatttcga   120
ccgtaatcgc ccgccggccg agcggccaga ccttattagt ccagcatcac acggtgcatc   180
gtatcgtgga gggcgaacaa ccgcctaagg ttcgccacgt agccatccac atccgccctt   240
gccgctcgcg caagggaagc agaatgcttg atagcgactt cgcgggcgtc tttggtagcc   300

<210> SEQ ID NO 5
<211> LENGTH: 300
<212> TYPE: DNA
<213> ORGANISM: Methylobacterium

<400> SEQUENCE: 5
tgtgggcgct catggaaacg ggggacgtgc ttttttgatc tctagccatt gtcatcatcc    60
atcggtccgg gtgacaggcc tttacgcaca taacaacggt tatttcgatc agccccctcc   120
tgatcgcaca agtcagctat acagatgctt ctgaaagcca acaaaggcgt tacgtatctg   180 cgtgaccccca ccgagctgcg ctgcggcatc gctgacagct ctgtatttta attcgaggag   240
gtggggcaat ttagcctggt caagctcgcc aacgtcttcc ttcacatatt gagacaggac   300

<210> SEQ ID NO 6
<211> LENGTH: 300
<212> TYPE: DNA
<213> ORGANISM: Methylobacterium

<400> SEQUENCE: 6
agagtgtatt tccccaagac tttatctctt tgctcatcac aaaacagccc gctcaagatg    60
atatgcgctg ggatttgtgc cgcgacccgt tgtaattgta tttacctctc ggctcatgtt   120
ccctgtcgcc ggagcgattg gaggtaaagt aatctcaact ttgcggccca tggctgatgc   180
tagctcagct acgcgaccta aggtaatatc tttgtgtccg cggagttcgc gatgaatgac   240
cgagcgattg acgccgatgg tgcgggcaat atcggcttga gttagaccgt tcttggcttc   300

<210> SEQ ID NO 7
<211> LENGTH: 300
<212> TYPE: DNA
<213> ORGANISM: Methylobacterium

<400> SEQUENCE: 7
acctgtctcg acatcggggg cagccacgag gcgtcggccg tggtagatct cggcgaagcg    60
gtagtagtgg gcgaggtccc catcgggatc gatgggggag tccggcgtac cttctccctc   120
ttctgcgatt agcgacaggg ctcgcatggc gctgggtgcg tcagtgatgg cgaacaacct   180
actatcgggg aaccaccgcc tgtcgacgag ctggcggtcc gggtttcctt tgaagacagc   240
gtcacccagc gcttcgatct tctcaatcaa ggctgcgtag aactgcccga tggtcgcgaa   300

<210> SEQ ID NO 8
<211> LENGTH: 300
<212> TYPE: DNA
<213> ORGANISM: Methylobacterium

<400> SEQUENCE: 8
gacgtggtga cggtggcacc agtcgcccag cgaagcggct actgtactga gcccgcagtc    60
```

```
atgtcggctg aagaaatggt cgatatgccc cagggaggtc gggcgtaggt cgtacctcaa    120
attcaccggc aggatcttgt ccagcaaggc gtccgaattc gcatcgacct gacttaggaa    180
attaccgagg taatcgctcg gtccgttcgc gtcggcggcc tgcatcgcca gcagcgcctt    240
atgctcggtc gtcaactcac gagcgaatat tgtccaggac aggttgtcga cctcggcgac    300

<210> SEQ ID NO 9
<211> LENGTH: 300
<212> TYPE: DNA
<213> ORGANISM: Methylobacterium

<400> SEQUENCE: 9
gagcatggca ggccaccacg catcgcttct tcatcacctt gctcggacga cttgctgctt     60
tgtcggtctc tctctcaagg acgagacgct gcgacacttg cttcgtcaga gtgccaggat    120
taatcccggt caataccact actacgtcag ctggcgtgcg ccgggcggca cgagggacgt    180
cgacgcggaa cgattgattc gagacgctaa ctttgacgtg tacaatttag tcacgctttt    240
ccttagcgac gccgagatag cctcgttggg ccgcttgctc accgccgatg cagccgagtt    300

<210> SEQ ID NO 10
<211> LENGTH: 300
<212> TYPE: DNA
<213> ORGANISM: Methylobacterium

<400> SEQUENCE: 10
aacgcgatgg gagcagcacg taatgggcgt catacaagat ataaagaag gacttgaagg      60 tagaatagat aaccttaagg aaaatattga taatatcagt tccagtatca catgcacaat    120
acaaggagtg ccgaaggtcg agtcagaaag aattttggga tgtgcaaacg cttcgtttga    180
ccaaatacag aaaatgtgga tgaatggtcc tacggatagg gctgcatttc tcgacgccgt    240
gaaaagtttg atagaccgca acgcaagtaa tggaaaattc ggagttccag gatcatattg    300

<210> SEQ ID NO 11
<211> LENGTH: 300
<212> TYPE: DNA
<213> ORGANISM: Methylobacterium

<400> SEQUENCE: 11
ttttcctttc gcgcctatga cctgagtgcg gccgaagctg tccgcttatt agagttttac     60
aaccagatgc gagcggctta gctcttcctc cgttattaag cagggcgcct cttcttaggg    120 gcgcccttc atatttaatc ttgtctgatg tctggcgcca tatcagacaa acatcagcgt    180
tgaccttgat tttgcatcta cattagggtt gctcccagaa tggagccgcc gatgtccgtc    240
ccgtacctca agcgagagat gtggggtgtg tattacatcc attggcgcga gggcggccgc    300

<210> SEQ ID NO 12
<211> LENGTH: 300
<212> TYPE: DNA
<213> ORGANISM: Methylobacterium

<400> SEQUENCE: 12
gttggagatg gtgccgtttg caaccgtcag atcgcctact gtgaatccgg tgacctcccg     60
agagaacgtg aaggtaactg tcgtagtctc gccaactgcc aaagaggtgt ccgcaacggc    120
gatggtcgct gtcggggcgc ttgtttggac atcaacggtg agaccgccg aggcaggccc    180 cgtgttacca gcggtatcga cggccctagc ggtgaccgtg tgcgatccag ccgttagcgt    240
```
cgaactggtg atgctatagg tcccgccgat cgccactgcc gagcccagaa tggtcgtgcc        300

<210> SEQ ID NO 13
<211> LENGTH: 300
<212> TYPE: DNA
<213> ORGANISM: Methylobacterium

<400> SEQUENCE: 13
accgaaggcg tccccggaca cgaaggcctg aaacaccata tctgtggcga tcaggccgac        60
gtggtcgcgg acttcaactg gcagagaatg ccaggccgct tcgatttcag atgatactgg       120
tacggacata ggagcggctt agctttctca gtgcaaatgt gattgattcc ggctcaaaaa       180
tgatcttgat cggacgagac gttttcaatc catgtcgtgt tgccatcgcc gatcggtgcg       240
tcaagagaca gatggcgccg accgtagata cgcgttcggg ttgcccgcac cgcttctcca       300

<210> SEQ ID NO 14
<211> LENGTH: 300
<212> TYPE: DNA
<213> ORGANISM: Methylobacterium

<400> SEQUENCE: 14
ggaggtgtga tctgatgatg tgctggatga aattggcggt cgagcacttg ttcagcttgg        60
ccagctcgac gagatcggcg tgatgctcgg cgtcgatcag gatgttcagc gagaccggac       120
gtacgcagga cttggtatta gcgccgttgc gcatcagctt gcagccttgc tctgcttctc       180
agcgtgccgc gtcaggatga ccctgatgta gctgttgagg ttgatgccgt aatagcctgc       240
ggactctgtg agatcccggc gaagatcgtc ggcgagggtc aggcggatgg tgctggtcgg       300

<210> SEQ ID NO 15
<211> LENGTH: 300
<212> TYPE: DNA
<213> ORGANISM: Methylobacterium

<400> SEQUENCE: 15
aagtaaccgc tcaacatgat cttcagcatg ttgtccaaca gcaggagaat acatgtaatt        60
caccatgacc ggcaagctgc gactggccat tgcttccacc gcttgaatgt agcgatcgaa       120
tttcgcaaaa tcagggtgga atgaaaatat cgaaccaaac tgcgagcctt gaatccgttc       180
tgcaaaatta tcgaaaaatt ttcttggccg actgccgttc gaaaacattc ttacgtttac       240
atgcggcccg cctgaaacaa gacagtctac cagctctggg aaatgggggt gaagggtcgg       300

<210> SEQ ID NO 16
<211> LENGTH: 21
<212> TYPE: DNA
<213> ORGANISM: Artificial Sequence
<220> FEATURE:
<223> OTHER INFORMATION: Primer

<400> SEQUENCE: 16
cacgtgttct gtcactctat t                                                  21

<210> SEQ ID NO 17
<211> LENGTH: 20
<212> TYPE: DNA
<213> ORGANISM: Artificial Sequence
<220> FEATURE:
<223> OTHER INFORMATION: Primer

<400> SEQUENCE: 17
gaaccggaaa ccactctatg                                                    20

```
<210> SEQ ID NO 18
<211> LENGTH: 19
<212> TYPE: DNA
<213> ORGANISM: Artificial Sequence
<220> FEATURE:
<223> OTHER INFORMATION: Probe

<400> SEQUENCE: 18
agcaatcatc tcgcggctc                                                    19

<210> SEQ ID NO 19
<211> LENGTH: 21
<212> TYPE: DNA
<213> ORGANISM: Artificial Sequence
<220> FEATURE:
<223> OTHER INFORMATION: Primer

<400> SEQUENCE: 19
gcgcactgag caaatttata g                                                 21

<210> SEQ ID NO 20
<211> LENGTH: 18
<212> TYPE: DNA
<213> ORGANISM: Artificial Sequence
<220> FEATURE:
<223> OTHER INFORMATION: Primer

<400> SEQUENCE: 20
ctgaattgcg agcagaca                                                     18

<210> SEQ ID NO 21
<211> LENGTH: 20
<212> TYPE: DNA
<213> ORGANISM: Artificial Sequence
<220> FEATURE:
<223> OTHER INFORMATION: Probe

<400> SEQUENCE: 21
agtgaaggtt tagcagtccg                                                   20

<210> SEQ ID NO 22
<211> LENGTH: 21
<212> TYPE: DNA
<213> ORGANISM: Artificial Sequence
<220> FEATURE:
<223> OTHER INFORMATION: Primer

<400> SEQUENCE: 22
ctacttgatg cgacgataca c                                                 21

<210> SEQ ID NO 23
<211> LENGTH: 21
<212> TYPE: DNA
<213> ORGANISM: Artificial Sequence
<220> FEATURE:
<223> OTHER INFORMATION: Primer

<400> SEQUENCE: 23
ggttggaagt gatcggaata g                                                 21

<210> SEQ ID NO 24
<211> LENGTH: 20
<212> TYPE: DNA
<213> ORGANISM: Artificial Sequence
<220> FEATURE:
```

<223> OTHER INFORMATION: Probe

<400> SEQUENCE: 24
tcgttcgcca tacatacacg                                                    20

<210> SEQ ID NO 25
<211> LENGTH: 22
<212> TYPE: DNA
<213> ORGANISM: Artificial Sequence
<220> FEATURE:
<223> OTHER INFORMATION: Primer

<400> SEQUENCE: 25
gctccttcct catatacgct tc                                                 22

<210> SEQ ID NO 26
<211> LENGTH: 22
<212> TYPE: DNA
<213> ORGANISM: Artificial Sequence
<220> FEATURE:
<223> OTHER INFORMATION: Primer

<400> SEQUENCE: 26
ccgtgtgatg ctggactaat aa                                                 22

<210> SEQ ID NO 27
<211> LENGTH: 20
<212> TYPE: DNA
<213> ORGANISM: Artificial Sequence
<220> FEATURE:
<223> OTHER INFORMATION: Probe

<400> SEQUENCE: 27
taatttcgac cgtaatcgcc                                                    20

<210> SEQ ID NO 28
<211> LENGTH: 22
<212> TYPE: DNA
<213> ORGANISM: Artificial Sequence
<220> FEATURE:
<223> OTHER INFORMATION: Primer

<400> SEQUENCE: 28
tgatcgcaca agtcagctat ac                                                 22

<210> SEQ ID NO 29
<211> LENGTH: 20
<212> TYPE: DNA
<213> ORGANISM: Artificial Sequence
<220> FEATURE:
<223> OTHER INFORMATION: Primer

<400> SEQUENCE: 29
cgagcttgac caggctaaat                                                    20

<210> SEQ ID NO 30
<211> LENGTH: 20
<212> TYPE: DNA
<213> ORGANISM: Artificial Sequence
<220> FEATURE:
<223> OTHER INFORMATION: Probe

<400> SEQUENCE: 30
acgcctttgt tggctttcag                                                    20

```
<210> SEQ ID NO 31
<211> LENGTH: 20
<212> TYPE: DNA
<213> ORGANISM: Artificial Sequence
<220> FEATURE:
<223> OTHER INFORMATION: Primer

<400> SEQUENCE: 31
cggagcgatt ggaggtaaag                                          20

<210> SEQ ID NO 32
<211> LENGTH: 22
<212> TYPE: DNA
<213> ORGANISM: Artificial Sequence
<220> FEATURE:
<223> OTHER INFORMATION: Primer

<400> SEQUENCE: 32
ctccgcggac acaaagatat ta                                       22

<210> SEQ ID NO 33
<211> LENGTH: 19
<212> TYPE: DNA
<213> ORGANISM: Artificial Sequence
<220> FEATURE:
<223> OTHER INFORMATION: Probe

<400> SEQUENCE: 33
aatctcaact ttgcggccc                                           19

<210> SEQ ID NO 34
<211> LENGTH: 22
<212> TYPE: DNA
<213> ORGANISM: Artificial Sequence
<220> FEATURE:
<223> OTHER INFORMATION: Primer

<400> SEQUENCE: 34
cttctccctc ttctgcgatt ag                                       22

<210> SEQ ID NO 35
<211> LENGTH: 21
<212> TYPE: DNA
<213> ORGANISM: Artificial Sequence
<220> FEATURE:
<223> OTHER INFORMATION: Primer

<400> SEQUENCE: 35
gacgctgtct tcaaaggaaa c                                        21

<210> SEQ ID NO 36
<211> LENGTH: 19
<212> TYPE: DNA
<213> ORGANISM: Artificial Sequence
<220> FEATURE:
<223> OTHER INFORMATION: Probe

<400> SEQUENCE: 36
tgatggcgaa caacctact                                           19

<210> SEQ ID NO 37
<211> LENGTH: 21
<212> TYPE: DNA
<213> ORGANISM: Artificial Sequence
<220> FEATURE:
<223> OTHER INFORMATION: Primer
```

```
<400> SEQUENCE: 37
gcatcgacct gacttaggaa a                                           21

<210> SEQ ID NO 38
<211> LENGTH: 20
<212> TYPE: DNA
<213> ORGANISM: Artificial Sequence
<220> FEATURE:
<223> OTHER INFORMATION: Primer

<400> SEQUENCE: 38
gagttgacga ccgagcataa                                             20

<210> SEQ ID NO 39
<211> LENGTH: 19
<212> TYPE: DNA
<213> ORGANISM: Artificial Sequence
<220> FEATURE:
<223> OTHER INFORMATION: Probe

<400> SEQUENCE: 39
aggtaatcgc tcggtccgt                                              19

<210> SEQ ID NO 40
<211> LENGTH: 22
<212> TYPE: DNA
<213> ORGANISM: Artificial Sequence
<220> FEATURE:
<223> OTHER INFORMATION: Primer

<400> SEQUENCE: 40
ctttgtcggt ctctctctca ag                                          22

<210> SEQ ID NO 41
<211> LENGTH: 23
<212> TYPE: DNA
<213> ORGANISM: Artificial Sequence
<220> FEATURE:
<223> OTHER INFORMATION: Primer

<400> SEQUENCE: 41
cagctgacgt agtagtggta ttg                                         23

<210> SEQ ID NO 42
<211> LENGTH: 19
<212> TYPE: DNA
<213> ORGANISM: Artificial Sequence
<220> FEATURE:
<223> OTHER INFORMATION: Probe

<400> SEQUENCE: 42
tcgtcagagt gccaggatt                                              19

<210> SEQ ID NO 43
<211> LENGTH: 24
<212> TYPE: DNA
<213> ORGANISM: Artificial Sequence
<220> FEATURE:
<223> OTHER INFORMATION: Primer

<400> SEQUENCE: 43
gttccagtat cacatgcaca atac                                        24

<210> SEQ ID NO 44
<211> LENGTH: 21
```

```
<212> TYPE: DNA
<213> ORGANISM: Artificial Sequence
<220> FEATURE:
<223> OTHER INFORMATION: Primer

<400> SEQUENCE: 44
cgtaggacca ttcatccaca t                                          21

<210> SEQ ID NO 45
<211> LENGTH: 19
<212> TYPE: DNA
<213> ORGANISM: Artificial Sequence
<220> FEATURE:
<223> OTHER INFORMATION: Probe

<400> SEQUENCE: 45
tttgggatgt gcaaacgct                                             19

<210> SEQ ID NO 46
<211> LENGTH: 22
<212> TYPE: DNA
<213> ORGANISM: Artificial Sequence
<220> FEATURE:
<223> OTHER INFORMATION: Primer

<400> SEQUENCE: 46
gcttagctct tcctccgtta tt                                         22

<210> SEQ ID NO 47
<211> LENGTH: 21
<212> TYPE: DNA
<213> ORGANISM: Artificial Sequence
<220> FEATURE:
<223> OTHER INFORMATION: Primer

<400> SEQUENCE: 47
attctgggag caaccctaat g                                          21

<210> SEQ ID NO 48
<211> LENGTH: 20
<212> TYPE: DNA
<213> ORGANISM: Artificial Sequence
<220> FEATURE:
<223> OTHER INFORMATION: Probe

<400> SEQUENCE: 48
atcttgtctg atgtctggcg                                            20

<210> SEQ ID NO 49
<211> LENGTH: 22
<212> TYPE: DNA
<213> ORGANISM: Artificial Sequence
<220> FEATURE:
<223> OTHER INFORMATION: Primer

<400> SEQUENCE: 49
cgtgaaggta actgtcgtag tc                                         22

<210> SEQ ID NO 50
<211> LENGTH: 21
<212> TYPE: DNA
<213> ORGANISM: Artificial Sequence
<220> FEATURE:
<223> OTHER INFORMATION: Primer

<400> SEQUENCE: 50
```
caccgttgat gtccaaacaa g                                                21

<210> SEQ ID NO 51
<211> LENGTH: 19
<212> TYPE: DNA
<213> ORGANISM: Artificial Sequence
<220> FEATURE:
<223> OTHER INFORMATION: Probe

<400> SEQUENCE: 51
aactgccaaa gaggtgtcc                                                   19

<210> SEQ ID NO 52
<211> LENGTH: 22
<212> TYPE: DNA
<213> ORGANISM: Artificial Sequence
<220> FEATURE:
<223> OTHER INFORMATION: Primer

<400> SEQUENCE: 52
cataggagcg gcttagcttt ct                                               22

<210> SEQ ID NO 53
<211> LENGTH: 22
<212> TYPE: DNA
<213> ORGANISM: Artificial Sequence
<220> FEATURE:
<223> OTHER INFORMATION: Primer

<400> SEQUENCE: 53
gatggcaaca cgacatggat tg                                               22

<210> SEQ ID NO 54
<211> LENGTH: 21
<212> TYPE: DNA
<213> ORGANISM: Artificial Sequence
<220> FEATURE:
<223> OTHER INFORMATION: Probe

<400> SEQUENCE: 54
cagtgcaaat gtgattgatt c                                                21

<210> SEQ ID NO 55
<211> LENGTH: 24
<212> TYPE: DNA
<213> ORGANISM: Artificial Sequence
<220> FEATURE:
<223> OTHER INFORMATION: Primer

<400> SEQUENCE: 55
gacgtacgca ggacttggta ttag                                             24

<210> SEQ ID NO 56
<211> LENGTH: 24
<212> TYPE: DNA
<213> ORGANISM: Artificial Sequence
<220> FEATURE:
<223> OTHER INFORMATION: Primer

<400> SEQUENCE: 56
ctcaacagct acatcagggt catc                                             24

<210> SEQ ID NO 57
<211> LENGTH: 20
<212> TYPE: DNA
<213> ORGANISM: Artificial Sequence

```
<220> FEATURE:
<223> OTHER INFORMATION: Probe

<400> SEQUENCE: 57
ttgctctgct tctcagcgtg                                               20

<210> SEQ ID NO 58
<211> LENGTH: 20
<212> TYPE: DNA
<213> ORGANISM: Artificial Sequence
<220> FEATURE:
<223> OTHER INFORMATION: Primer

<400> SEQUENCE: 58
aaccaaactg cgagccttga                                               20

<210> SEQ ID NO 59
<211> LENGTH: 21
<212> TYPE: DNA
<213> ORGANISM: Artificial Sequence
<220> FEATURE:
<223> OTHER INFORMATION: Primer

<400> SEQUENCE: 59
gggccgcatg taaacgtaag a                                             21

<210> SEQ ID NO 60
<211> LENGTH: 17
<212> TYPE: DNA
<213> ORGANISM: Artificial Sequence
<220> FEATURE:
<223> OTHER INFORMATION: Probe

<400> SEQUENCE: 60
ttcttggccg actgccg                                                  17

<210> SEQ ID NO 61
<211> LENGTH: 300
<212> TYPE: DNA
<213> ORGANISM: Methylobacterium

<400> SEQUENCE: 61
gcaaaacgac ctaatagttc tacagcggca tgcgccaagt cagcgcggtg aacagtatac    60
ctgggagcaa cttgtcctcc gaaacccaca taaaacaaat tactcctggc agtgccagt    120 ccatcaaaat cgaatacaat atttctcgag gaggcatctg taatagcctg ccaaagcaac   180
aaagctatgg cgccgttatg actttcattg cttctggtag acataaaata atatgccgat   240
ttgtgatccc aaatgtagaa tattgccgca tcaattgcgc caagtttatt tcggatcgat   300

<210> SEQ ID NO 62
<211> LENGTH: 300
<212> TYPE: DNA
<213> ORGANISM: Methylobacterium

<400> SEQUENCE: 62
ggcgccaacg gtatgatcgc atgatttttcc tgcggcatag cttgcgggaa tggcgtattt    60
ggcgctctcc tcaggaattt ctaagggcat acgcaggaac tctacagcac ttttactggt   120
attttgtagt gacagcggag gaggctggtg ctcaaggtaa tcgtgatgaa gtgatccggg   180
ccattcgggg cgcgtttcta gtctttccaa tccgcgccct gtaccacgta ttacgccgga   240
ccggtctgcg ccgcgccgcc ctcttgaccg ccctaaatgt ctaagagcgt ctaacaaagc   300
```

```
<210> SEQ ID NO 63
<211> LENGTH: 300
<212> TYPE: DNA
<213> ORGANISM: Methylobacterium

<400> SEQUENCE: 63
gacgatatcg ctcatcttca ctgcattgaa gctggtgccg tactgcatag ggatgaaaaa      60
gtgatgcgga tagacggctg acgggaaagc gcctggtcga tcgaagactt tgctgacgag     120
gttgtggtag ccccggatat aggcatcgaa ggccgggacg ttgatcccat cctttgcctt     180
atcttgactg gcgtcgtcgc gtgccgtcag aacgggcacg tcgcaggtca tcgaggccag     240
caccttgcgg aacacctgcg ttccgccgtt gggattatcg acggcgaacg cggtggccgc     300

<210> SEQ ID NO 64
<211> LENGTH: 300
<212> TYPE: DNA
<213> ORGANISM: Methylobacterium

<400> SEQUENCE: 64
gcccttctgt caggcgatat tgtataatgg cgttgcccca atagaagcag ccattcgtgc      60
gagggcagca gcgacgctag gtcgaaagag catcctaatc tcgatcaaga tgcgactgag     120
atttctgatg aaaatatcta gacacaagca aagctggtga aattacaacg atcatggcga     180
caattgcggc caattcggcc ggaacttgaa ggaacataaa aatgaatatt acaaatatac     240
cgcaaagcat gtagagttgc tacaccaagg gtcgggacgt ccaaaaaaac tcactgagga     300

<210> SEQ ID NO 65
<211> LENGTH: 300
<212> TYPE: DNA
<213> ORGANISM: Methylobacterium

<400> SEQUENCE: 65
ggaacataaa aatgaatatt acaaatatac cgcaaagcat gtagagttgc tacaccaagg      60
gtcgggacgt ccaaaaaaac tcactgagga agtcgactgg aagcacgagg cgccccccc     120 aggagcgggg cgaccggcaa gggggcccgc aattgtcgcc atgatcgacc agcttaggta     180
ggatcctctt tcgacctaac gaatggctgc ttctattggg gcaacgccat tatacaatat     240
cgcctgacca tctggaacgc ggcccggtcc accggcaggt tggcgacgac agcgtcggag     300

<210> SEQ ID NO 66
<211> LENGTH: 300
<212> TYPE: DNA
<213> ORGANISM: Methylobacterium

<400> SEQUENCE: 66
cggcgtcgac cagccgggcg aactgcttgg gcatgctctc ccgcgacgcc ggccacagcc      60
gcgtccccgt ccctccgcac aggatcatcg ggtggatttg aaaggcaaaa cgggacatca     120
ggataggccg ctcaggcgtt ggcgctgagg cgcttgatgt cggcgtcgac catctcggtg     180
atcagcgcct cgaggctggt ctcggcctcc cagccgaagg tcgccttggc cttggcgggg     240
ttgcccagca gcacctcgac ctctgccggc cggaacagcg ccgggtcgac gatcaggtgg     300

<210> SEQ ID NO 67
<211> LENGTH: 300
<212> TYPE: DNA
<213> ORGANISM: Methylobacterium

<400> SEQUENCE: 67
```

```
ctggacatgc gcccaccccg gccaagtccg accgcaccgg caaccgctcc tgtagtcgtc    60
gtcatcgttc tcacccctga ggcggagacc gtccgctaac ggggtgtctc aagcaaccgt   120
ggggcggagg aacacgcacg tagtcgcgtt tcaaggttcg cacgaacgcc tcggccatgc   180
cgttgctctg cgggctctcc agcggcgtcg ttttggcac caaaccaagg tcgcgggcga   240
agcggcgcgt gtcgcgggga ctgtcaggaa tttcgtgtgg gggcggccat agtggatccg   300
```

<210> SEQ ID NO 68
<211> LENGTH: 300
<212> TYPE: DNA
<213> ORGANISM: Methylobacterium

<400> SEQUENCE: 68

```
ggaaatcggc ttcaagtacg acgtcacgcc ggccatgcag gtcacgggtg cactgttcaa    60
tctcgagcgc gacaaccagc cgttcccctc gaacgtggag tccggcctcg tccttggcgc   120
aggtcagaca cgcacccagg gcgcggaaat cggcctggcc ggctatctaa ccgattggtg   180
gcaggtcttt ggcggctacg cttataccga ggcacgcgta ctctcgccac tggaagacga   240
tggagacgtg atcgcagcag gtaatctcgt cggcaacgtt ccgctaaata ctttcagtct   300
```

<210> SEQ ID NO 69
<211> LENGTH: 300
<212> TYPE: DNA
<213> ORGANISM: Methylobacterium

<400> SEQUENCE: 69

```
cggcctggcc ggctatctaa ccgattggtg gcaggtcttt ggcggctacg cttataccga    60
ggcacgcgta ctctcgccac tggaagacga tggagacgtg atcgcagcag gtaatctcgt   120
cggcaacgtt ccgctaaata ctttcagtct gttcaacaag ttcgatatca acgagaattt   180
ctccgttgct ctgggctatt actatcagga tgccagcttt gcctcctcag acaatgcagt   240
gcgtttgcca agttattcgc ggttcgatgg cgggttgttc tatcgattcg acgagttgac   300
```

<210> SEQ ID NO 70
<211> LENGTH: 300
<212> TYPE: DNA
<213> ORGANISM: Methylobacterium

<400> SEQUENCE: 70

```
acgttccgct aaatactttc agtctgttca acaagttcga tatcaacgag aatttctccg    60
ttgctctggg ctattactat caggatgcca gctttgcctc ctcagacaat gcagtgcgtt   120
tgccaagtta ttcgcggttc gatggcgggt tgttctatcg attcgacgag ttgacacgcg   180
ttcagcttag cgtcgagaac attttcgaca ggcgttacat catcaactcc aacaacaaca   240
acaacctcac gcctggcgcg ccgagaacag tccgcgtgca attgatcgct cggttctaaa   300
```

<210> SEQ ID NO 71
<211> LENGTH: 300
<212> TYPE: DNA
<213> ORGANISM: Methylobacterium

<400> SEQUENCE: 71

```
agcccacaag cctgatgcac ttaactacat cctctaatgt cgcgccaatt tgcttggcgg    60
caggggatgt tgtatcgtca taggcttgtc taaccggaac ttgtttgcca atctctttgg   120
cgatcgcaac cgccatctcg tgttcgtcaa ccatgtgcgc gttcctctaa ttgcactcat   180
```
ggtgccacgt gcacctccga tcgtctcgtg tctagaatga aggtgggaac aaccttacac    240
aggctttcgc gacgcgcgaa tttctggttt ctccgcctcg gatgtgggtt tgagcgcttc    300

<210> SEQ ID NO 72
<211> LENGTH: 300
<212> TYPE: DNA
<213> ORGANISM: Methylobacterium

<400> SEQUENCE: 72
cttttcattt gtcatgatct cgaccaaggt attcacggca agctcggtct gttgcttagc     60
aagtgcctga acttcgcgaa cgatcggctc tcgacccttc gggttcgaga cctgtccctt    120
ttgaaaacca cgtgccctac acttttcggg atcaaggtgc gggttggctt tggtcaaaat    180
tctctggcgt cccattacac gccctccgca tcatcgttcc cgcgaacgat ctgaccccg     240 acttccgcga ggaagcgtgt ggcgtgatcc tcgaagcgga atgccacctc gaactgttcc    300

<210> SEQ ID NO 73
<211> LENGTH: 300
<212> TYPE: DNA
<213> ORGANISM: Methylobacterium

<400> SEQUENCE: 73
cagcagcaag cagatcgttg aaaaccgctt gaaccgcatc ttgatcggga ccggaaccaa     60
tcaggtcatc taggtaaacc gagacgtaaa ctcgtttgcg ctcggcatct ttcagaacgt    120
ccgtgatgcc agaccgcatt agtaccatcg tcgccaaggc gggcgactga acgaagccga    180
tcggcagaga gtaacgggga ccgcccctaa tcgggttgcg aacgcaagac cacttagcaa    240
aggttcgagc acggccgaac ttcgcatggt ggagagccgc ggcaacacgg ttccgtgata    300

<210> SEQ ID NO 74
<211> LENGTH: 300
<212> TYPE: DNA
<213> ORGANISM: Methylobacterium

<400> SEQUENCE: 74
tagacattcc aacaaaccgg caagaggctc gtcctcactc gaggatttgt tgggacttgc     60
atgatgtcga agcggagccg ttatgacctg ggtgcgatca tgcgccgagc atgggagatg    120
gctcgggagg cggcattcgc ggttggcgag cgggcacgga ctcaccttgc tgccgcgatg    180
cgcagcgcgt gggccgaagc caagttggca ctcgcgccca cgaagacgga gcaggatcgt    240
ctctctccga gcgacatgat cggacatgag gacgcctacc aaggccgggt tctaaaatat    300

<210> SEQ ID NO 75
<211> LENGTH: 300
<212> TYPE: DNA
<213> ORGANISM: Methylobacterium

<400> SEQUENCE: 75
aagatggata cgacaagcgc gattacatta tttgcgaaat agatggacaa ataaaagaca     60
aaggactgat gtatttcctt aaatctggac aagttgacct ctttcacata gaagtcacca    120 ctcccttttgg gacaatttgg tgtcacgaaa acatagaggc cgaacttctt agctgaatta    180
tcgcgctccg ggttcttatg cggctgagtg aagcgcggga cagcttgcga gcagggccgc    240
caatggcagc cgggatgaca caatgctcgg tctcccgacg cttcttcaat cgggagcgct    300

<210> SEQ ID NO 76
<211> LENGTH: 299

```
<212> TYPE: DNA
<213> ORGANISM: Methylobacterium

<400> SEQUENCE: 76
agctgaatta tcgcgctccg ggttcttatg cggctgagtg aagcgcggga cagcttgcga      60
gcagggccgc caatggcagc cgggatgaca caatgctcgg tctcccgacg cttcttcaat     120
cgggagcgct tcgcagcccg gggcggcgcg ctcatgcgtc acgacctggg ccctgcgcac     180
cttcgcggcc ccgccgtccc ggcagatccc tgatgcccca agtgggcggc cactccatca     240
aagaaccccg gcctgtggca gatctcgtag gcataccgag gttccgcagt gcccccacc      299

<210> SEQ ID NO 77
<211> LENGTH: 300
<212> TYPE: DNA
<213> ORGANISM: Methylobacterium

<400> SEQUENCE: 77
acggtcaccc cacggactgg gcgagtacct caccggtgtt ctatcataac gccgagttag      60
ttttcgaccg tcccttatgc gatgtaccac cggtgtcggc agccgatttc gtcccaccgg     120
gagctggcgt tccggttcag accaccatca tcggtcacga tgtctggatt ggacacgggg     180
ccttcatctc ccccggcgtg actataggaa acggcgcgat cgtcggggcc caggcggtcg     240
tcacaagaga tgtcccaccc tatgcggtag ttgctggcgt ccccgcgacc gtacgacgat     300

<210> SEQ ID NO 78
<211> LENGTH: 300
<212> TYPE: DNA
<213> ORGANISM: Methylobacterium

<400> SEQUENCE: 78
ccaataaaag cgttggccgc ctgggcaacc cgatccgagc ctaagactca aagcgcaagc      60
gaacacttgg tagagacagc ccgccgacta cggcgttcca gcactctccg gctttgatcg     120
gataggcatt ggtcaaggtg ccggtggtga tgacctcgcc cgccgcaagc ggcgaattac     180
tcggatcagc ggccagcacc tcgaccaagt gtcggagcgc gaccaaaggg ccacgttcga     240
ggacgtttga ggcgcgacca gtctcgatag tctcatcgtc gcggcgaagc tgcacctcga     300

<210> SEQ ID NO 79
<211> LENGTH: 300
<212> TYPE: DNA
<213> ORGANISM: Methylobacterium

<400> SEQUENCE: 79
cgatggcacc gacctgccat gcctctgccg tccgcgccag aatggtaaag aggacgaagg      60
gggtaaggat cgtcgctgca gtgttgagca gcgaccagaa aagggggccg aacatcggca     120
tcaaacctcg attgccactc ggacgcgaag cgcgtcttga aggagggatg gaagcgaaac     180
ggccgcagag taaccgccga cgaaagattg caccctcat cgagcaggat cggaggtgaa      240
ggcaagcgtg ggttattggt aagtgcaaaa aatataatgg tagcgtcaga tctagcgttc     300
```

METHODS AND COMPOSITIONS FOR IMPROVING SOYBEAN YIELD

CROSS-REFERENCE TO RELATED APPLICATIONS

This patent application is a 35 U.S.C. § 371 application of International Patent Application No. PCT/US2020/034235 filed May 22, 2020, which claims the benefit of U.S. 62/884,423, filed Aug. 8, 2019, each of which is incorporated herein by reference in its entirety.

SEQUENCE LISTING STATEMENT

A sequence listing containing the file named "53907_197268_ST25.txt" which is 24090 bytes (measured in MS-Windows®) and created on May 7, 2020, contains 79 nucleotide sequences, is provided herewith via the USPTO's EFS system, and is incorporated herein by reference in its entirety.

BACKGROUND

One-carbon organic compounds such as methane and methanol are found extensively in nature, and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum*, and *Methylocella* (Lidstrom, 2006). Methanotrophs possess the enzyme methane monooxygenase, that incorporates an atom of oxygen from $O_2$ into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. Methylotrophic bacteria include species in the genera *Methylobacterium, Hyphomicrobium, Methylophilus, Methylobacillus, Methylophaga, Aminobacter, Methylorhabdus, Methylopila*, Methylosulfonomonas, Marinosulfonomonas, *Paracoccus, Xanthobacter, Ancylobacter* (also known as *Microcyclus*), *Thiobacillus, Rhodopseudomonas, Rhodobacter, Acetobacter, Bacillus, Mycobacterium*, Arthobacter, and *Nocardia* (Lidstrom, 2006).

Most methylotrophic bacteria of the genus *Methylobacterium* are pink-pigmented. They are conventionally referred to as PPFM bacteria, being pink-pigmented facultative methylotrophs. Green (2005, 2006) identified twelve validated species in the genus *Methylobacterium*, specifically *M. aminovorans, M. chloromethanicum, M. dichloromethanicum, M. extorquens, M. fujisawaense, M. mesophilicum, M. organophilum, M. radiotolerans, M. rhodesianum, M. rhodinum, M. thiocyanatum*, and *M. zatmanii*. However, *M. nidulans* is a nitrogen-fixing *Methylobacterium* that is not a PPFM (Sy et al., 2001). *Methylobacterium* are found in soil, dust, fresh water, sediments, and leaf surfaces, as well as in industrial and clinical environments (Green, 2006).

SUMMARY

Methods for improving soybean plant yield that comprise: (a) applying a composition to a soybean plant or a part thereof wherein the composition comprises (i) one or more of *Methylobacterium* NLS0934 (NRRL B-67341), NLS0497 (ISO22), NLS0693 (ISO23), NLS1179 (ISO24), NLS1181 (ISO25), NLS0610 (ISO26), or variants thereof, or (ii) a combination of *Methylobacterium* isolate NLS0109 (NRRL B-67340) or a variant thereof, and *Methylobacterium* isolate NLS0017 (B-50931) or NLS0610 (ISO26), or variants thereof; wherein said composition further comprises at least one additional component selected from the group consisting of an additional active ingredient, an agriculturally acceptable adjuvant, and an agriculturally acceptable excipient; and, (b) growing the soybean plant to maturity, thereby improving yield of the soybean plant, are provided herein. In certain embodiments of the methods, the composition is applied to a soybean seed. In certain embodiments of the aforementioned methods, the composition comprises a solid substance with the *Methylobacterium* grown thereon and adhered thereto, or an emulsion having the *Methylobacterium* grown therein. In certain embodiments of any of the aforementioned methods, the composition comprises the *Methylobacterium* at a titer of about $1\times10^6$ CFU/gm to about $1\times10^{14}$ CFU/gm for a solid composition or at a titer of about $1\times10^6$ CFU/mL to about $1\times10^{11}$ CFU/mL for a liquid composition. In certain embodiments of the aforementioned methods, the composition comprises NLS0934 (NRRL B-67341), NLS1181 (ISO25), or a variant thereof. In certain embodiments of any of the aforementioned methods, the *Methylobacterium* variant is glyphosate resistant or glufosinate resistant. In certain embodiments of the aforementioned methods, the applied composition coats or partially coats the soybean plant or a part thereof. In certain embodiments of the aforementioned methods, the composition is applied to foliage of the soybean plant. In certain embodiments of the aforementioned methods, the composition further comprises a fungicide. In certain embodiments of the aforementioned methods, the composition is applied at about the VE to about the R6 stage of development. In certain embodiments of the aforementioned methods, the composition is applied at about the V2 to about the V3 stage of development, about the V3 to V4, or V3 stage of development. In certain embodiments of the aforementioned methods, the methods further comprise the step of harvesting seed from the mature soybean plant. In certain embodiments of the aforementioned methods, yield of harvested seed is increased in comparison to yield of harvested seed obtained from a control soybean plant that did not receive an application of the *Methylobacterium*. In certain embodiments of the aforementioned methods, the composition is applied by spraying, coating, partially coating, immersing, and/or imbibing the soybean plant or plant part with the composition. In certain embodiments of the aforementioned methods, the applied composition coats or partially coats the soybean plant or a part thereof, wherein partial coating includes coating at least 5%, 10%, 20%, 30%, 40%, 50%, 60%, 70%, 80%, 90%, 95%, 98%, 99%, or about 99.5% of the surface area of the soybean plant or a part thereof. In certain embodiments of the aforementioned methods, the soybean plant part is a seed. In certain embodiments of the aforementioned methods, the composition comprises one or more of *Methylobacterium* isolate NLS0934 (NRRL B-67341), NLS0497 (ISO22), NLS0693 (ISO23), NLS1179 (ISO24), NLS1181 (ISO25), NLS0610 (ISO26), or a combination of *Methylobacterium* isolates NLS0109 (NRRL B-67340), and NLS0017 (B-50931) or NLS0610 (ISO26). In certain embodiments of the aforementioned methods, the composition further comprises an additional active ingredient. In certain embodiments of the aforementioned methods, the additional active ingredient is selected from the group consisting of a fungicide, insecticide, nematicide, and biological. In certain embodiments of the aforementioned methods, the biological is a biocontrol agent. In certain embodiments of the aforementioned methods, the additional active ingredient is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane. In certain embodiments of the aforementioned methods, the composition comprises (i) a *Methylobacterium* wherein the chromosomal genomic DNA has at least 99%, 99.9, 99.8, 99.7, 99.6%, or 99.5% sequence identity to chromosomal genomic DNA of one or more of NLS0934 (NRRL B-67341), NLS0497 (ISO22), NLS0693 (ISO23), NLS1179 (ISO24), NLS1181 (ISO25), or NLS0610 (ISO26), or (ii) a combination of *Methylobacterium* isolates wherein the chromosomal genomic DNA of a first isolate has at least 99%, 99.9, 99.8, 99.7, 99.6%, or 99.5% sequence identity to chromosomal genomic DNA of NLS0109 (NRRL B-67340), and chromosomal DNA of a second isolate has at least 99%, 99.9, 99.8, 99.7, 99.6%, or 99.5% sequence identity to chromosomal genomic DNA of NLS0017 (B-50931) or NLS0610 (ISO26). In certain embodiments of the aforementioned methods, the composition comprises (i) a *Methylobacterium* wherein the assembled genome DNA sequence of the *Methylobacterium* has an average nucleotide identity (ANI) score of at least 99.00 when compared to the assembled genome DNA sequence of NLS0934 (NRRL B-67341), NLS0497 (ISO22), NLS0693 (ISO23), NLS1179 (ISO24), NLS1181 (ISO25), or NLS0610 (ISO26), or (ii) a combination of *Methylobacterium* isolates wherein the ANI score of the assembled genome of the first isolate has an average nucleotide identity (ANI) score of at least 99.00 when compared to the assembled genome DNA sequence of NLS0109 (NRRL B-67340), and assembled genome DNA sequence of a second isolate has an average nucleotide identity (ANI) score of at least 99.00 when compared to the assembled genome DNA sequence of NLS0017 (B-50931) or NLS0610 (ISO26). In certain embodiments of the aforementioned methods where the composition comprises one or more of NLS0934 (NRRL B-67341), NLS0497 (ISO22), NLS0693 (ISO23), NLS1179 (ISO24), NLS1181 (ISO25), NLS0610 (ISO26), or variants thereof, the composition further comprises an additional *Methylobacterium* selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), ISO14 (NRRL B-50942) and ISO16 (NRRL B-67340).

Also provided herein are soybean plants or soybean plant parts that are coated or partially coated with a composition comprising a *Methylobacterium*, wherein the *Methylobacterium* is one or more of (i) NLS0934 (NRRL B-67341), NLS0497 (ISO22), NLS0693 (ISO23), NLS1179 (ISO24), NLS1181 (ISO25), NLS0610 (ISO26), or variants thereof, or (ii) a combination of *Methylobacterium* isolate NLS0109 (NRRL B-67340) or a variant thereof, and *Methylobacterium* isolate NLS0017 (B-50931) or a variant thereof. In certain embodiments, the composition further comprises at least one additional component selected from the group consisting of an additional active ingredient, an agriculturally acceptable adjuvant, and an agriculturally acceptable excipient. In certain aforementioned embodiments, the composition comprises the *Methylobacterium* at a titer of about $1\times10^6$ CFU/gm to about $1\times10^{14}$ CFU/gm for a solid composition or at a titer of about $1\times10^6$ CFU/mL to about $1\times10^{11}$ CFU/mL for a liquid composition. In certain aforementioned embodiments, the *Methylobacterium* is NLS0934 (NRRL B-67341) or NLS1181 (ISO25). In certain embodiments of any of the aforementioned compositions, the soybean plant part is selected from the group consisting of a seed, a stem, a flower, a leaf, a petiole, a pod, and an axillary bud. In certain aforementioned embodiments, the composition comprises one or more of *Methylobacterium* NLS0934 (NRRL B-67341), NLS0497 (ISO22), NLS0693 (ISO23), NLS1179 (ISO24), NLS1181 (ISO25), NLS0610 (ISO26), or a combination of *Methylobacterium* isolates NLS0109 (NRRL B-67340), and NLS0017 (B-50931) or NLS0610. In certain aforementioned embodiments, the composition comprises an additional active ingredient. In certain aforementioned embodiments, the additional active ingredient is selected from the group consisting of a fungicide, insecticide, nematicide, and biological. In certain aforementioned embodiments, the biological is a biocontrol agent. In certain aforementioned embodiments, the additional active ingredient is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane. In certain aforementioned embodiments, the composition comprises one or more *Methylobacterium* wherein the chromosomal genomic DNA has at least 99%, 99.9, 99.8, 99.7, 99.6%, or 99.5% sequence identity to chromosomal genomic DNA of NLS0934 (NRRL B-67341), NLS0497 (ISO22), NLS0693 (ISO23), NLS1179 (ISO24), NLS1181 (ISO25), or NLS0610 (ISO26), or (ii) a combination of *Methylobacterium* isolates wherein the chromosomal genomic DNA of a first isolate has at least 99%, 99.9, 99.8, 99.7, 99.6%, or 99.5% sequence identity to chromosomal genomic DNA of NLS0109 (NRRL B-67340), and wherein the chromosomal genomic DNA of a second isolate has at least 99%, 99.9, 99.8, 99.7, 99.6%, or 99.5% sequence identity to chromosomal genomic DNA of NLS0017 (B-50931) or NLS0610 (ISO26). In certain embodiments, the composition comprises (i) a *Methylobacterium* having genomic DNA comprising one or more polynucleotide marker fragments of at least 50, 60, 100, 120, 180, 200, 240, or 300 nucleotides of SEQ ID NOS: 1-15. In certain of the aforementioned embodiments, the composition further comprises an additional *Methylobacterium* selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), and ISO14 (NRRL B-50942); or a *Methylobacterium* having genomic DNA comprising one or more polynucleotide marker fragments of at least 50, 60, 100, 120, 180, 200, 240, or 300 nucleotides of SEQ ID NOS: 61-79.

Also provided herein are isolated *Methylobacterium* strains NLS0497 (ISO22), NLS0693 (ISO23), NLS1179 (ISO24), NLS1181 (ISO25), NLS0610 (ISO26), or variants thereof. Compositions comprising one or more of *Methylobacterium* NLS0497 (ISO22), NLS0693 (ISO23), NLS1179 (ISO24), NLS1181 (ISO25), NLS0610 (ISO26), variants thereof are also provided. In certain embodiments, the *Methylobacterium* strains or compositions coat or partially coat a soybean plant or a part thereof. In certain embodiments, the composition coats or partially coats the soybean seed. In certain embodiments, compositions that coat or partially coat a soybean plant, soybean seed, or other soybean plant part, comprise one of more of NLS0497 (ISO22), NLS0693 (ISO23), NLS1179 (ISO24), NLS1181 (ISO25), NLS0610 (ISO26), or variants thereof.

DESCRIPTION

Definitions

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Where a term is provided in the singular, embodiments comprising the plural of that term are also provided.

As used herein, the terms "include," "includes," and "including" are to be construed as at least having the features or encompassing the items to which they refer while not excluding any additional unspecified features or unspecified items.

As used herein, the phrases "adhered thereto" and "adherent" refer to *Methylobacterium* that are associated with a solid substance by growing, or having been grown, on a solid substance.

As used herein, the phrase "active ingredient" refers to a biological or pesticide in a composition for treatment of plants and/or plant parts.

As used herein, the term "biological" refers to a component of a composition for treatment of plants or plant parts comprised of or derived from a microorganism. Biologicals include biocontrol agents, other beneficial microorganisms, microbial extracts, natural products, plant growth activators or plant defense agents. Non-limiting examples of biocontrol agents include bacteria, fungi, beneficial nematodes, and viruses. In certain compositions, a biological can comprise a mono-culture or co-culture of *Methylobacterium*, or a combination of *Methylobacterium* strains or isolates that have been separately cultured.

As used herein, the phrase "agriculturally acceptable adjuvant" refers to a substance that enhances the performance of a biological or pesticide in a composition for treatment of plants and/or plant parts. In certain compositions, a biological can comprise a mono-culture or co-culture of *Methylobacterium*.

As used herein, the phrase "agriculturally acceptable excipient" refers to an essentially inert substance that can be used as a diluent and/or carrier for a biological or pesticide in a composition for treatment of plants and/or plant parts. In certain compositions, a biological can comprise a mono-culture or co-culture of *Methylobacterium*.

As used herein, the term "strain" shall include all isolates of such strain.

As used herein, the phrase "control plant" refers to a plant that had not received treatment with a yield enhancing *Methylobacterium* or composition comprising the same at either the seed or any subsequent stage of the control plant's development. In certain embodiments, a control plant can be a plant that was treated with an additional active ingredient or a yield neutral *Methylobacterium*.

As used herein, the phrase "co-culture of *Methylobacterium*" refers to a *Methylobacterium* culture comprising at least two strains of *Methylobacterium* or at least two species of *Methylobacterium*.

As used herein, the phrase "contaminating microorganism" refers to microorganisms in a culture, fermentation broth, fermentation broth product, or composition that were not identified prior to introduction into the culture, fermentation broth, fermentation broth product, or composition.

As used herein, "variant" when used in the context of a *Methylobacterium* isolate, refers to any isolate that has chromosomal genomic DNA with at least 99%, 99.9, 99.8, 99.7, 99.6%, or 99.5% sequence identity to chromosomal genomic DNA of a deposited *Methylobacterium* isolate provided herein. A variant of an isolate can be obtained from various sources including soil, plants or plant material and water, particularly water associated with plants and/or agriculture. Variants include derivatives obtained from deposited isolates. *Methylobacterium* isolates or strains can be sequenced (for example as taught by Sanger et al. (1977), Bentley et al. (2008) or Caporaso et al. (2012)) and genome-scale comparison of the sequences conducted (Konstantinidis et al. (2005)) using sequence analysis tools, such as BLAST, as taught by Altschul et al. (1990) or clustalw (www.ebi.ac.uk/Tools/msa/clustalw2/).

As used herein, "derivative" when used in the context of a *Methylobacterium* isolate, refers to any *Methylobacterium* that is obtained from a deposited *Methylobacterium* isolate provided herein. Derivatives of a *Methylobacterium* isolate include, but are not limited to, derivatives obtained by selection, derivatives obtained by mutagenesis and selection, and genetically transformed *Methylobacterium* obtained from the *Methylobacterium* isolate. A "derivative" can be identified, for example based on genetic identity to the strain or isolate from which it was obtained and will generally exhibit chromosomal genomic DNA with at least 99%, 99.9, 99.8, 99.7, 99.6%, or 99.5% sequence identity to chromosomal genomic DNA of the strain or isolate from which it was derived.

As used herein, "sequence identity" when used to evaluate whether a particular *Methylobacterium* strain is a variant or derivative of a *Methylobacterium* strain provided herein refers to a measure of nucleotide-level genomic similarity between the coding regions of two genomes. Sequence identity between the coding regions of bacterial genomes can be calculated, for example, by determining the Average Nucleotide Identity (ANI) score using FastANI (Jain et al. "High throughput ANI analysis of 90K prokaryotic genomes reveals clear species boundaries", Nat Communications 9, 5114 (2018)) and Han et al. ("ANI tools web: a web tool for fast genome comparison within multiple bacterial strains"; Database, 2016, 1-5).

As used herein, the term "emulsion" refers to a colloidal mixture of two immiscible liquids wherein one liquid is the continuous phase and the other liquid is the dispersed phase. In certain embodiments, the continuous phase is an aqueous liquid and the dispersed phase is liquid that is not miscible, or partially miscible, in the aqueous liquid.

As used herein, the phrase "essentially free of contaminating microorganisms" refers to a culture, fermentation broth, fermentation product, or composition where at least about 95% of the microorganisms present by amount or type in the culture, fermentation broth, fermentation product, or composition are the desired *Methylobacterium* or other desired microorganisms of pre-determined identity.

As used herein, the phrase "inanimate solid substance" refers to a substance which is insoluble or partially soluble in water or aqueous solutions and which is either non-living or which is not a part of a still-living organism from which it was derived.

As used herein, the phrase "mono-culture of *Methylobacterium*" refers to a *Methylobacterium* culture consisting of a single strain of *Methylobacterium*.

As used herein, a "pesticide" refers to an insecticide, fungicide, nematocide, bacteriocide, or any combination thereof.

As used herein, the phrase "bacteriostatic agent" refers to agents that inhibit growth of bacteria but do not kill the bacteria.

As used herein, the phrase "pesticide does not substantially inhibit growth of said *Methylobacterium*" refers to any pesticide that when provided in a composition comprising a fermentation product comprising a solid substance wherein a mono-culture or co-culture of *Methylobacterium* is adhered thereto, results in no more than a 50% inhibition of *Methylobacterium* growth when the composition is applied to a plant or plant part in comparison to a composition lacking the pesticide. In certain embodiments, the pesticide results in no more than a 40%, 20%, 10%, 5%, or 1% inhibition of *Methylobacterium* growth when the composition is applied to a plant or plant part in comparison to a composition lacking the pesticide.

As used herein, the term "*Methylobacterium*" refers to genera and species in the methylobacteriaceae family, including bacterial species in the *Methylobacterium* genus and proposed Methylorubrum genus (Green and Ardley (2018)). *Methylobacterium* includes pink-pigmented facultative methylotrophic bacteria (PPFM) and also encompasses the non-pink-pigmented *Methylobacterium nodulans*, as well as colorless mutants of *Methylobacterium* isolates. For example, and not by way of limitation, "*Methylobacterium*" refers to bacteria of the species listed below as well as any new *Methylobacterium* species that have not yet been reported or described that can be characterized as *Methylobacterium* or Methylorubrum based on phylogenetic analysis: *Methylobacterium adhaesivum; Methylobacterium oryzae; Methylobacterium aerolatum; Methylobacterium oxalidis; Methylobacterium aquaticum; Methylobacterium persicinum; Methylobacterium brachiatum; Methylobacterium phyllosphaerae; Methylobacterium brachythecii; Methylobacterium* phyllostachyos; *Methylobacterium bullatum; Methylobacterium platani; Methylobacterium cerastii; Methylobacterium* pseudosasicola; *Methylobacterium currus; Methylobacterium radiotolerans; Methylobacterium dankookense; Methylobacterium soli; Methylobacterium* frigidaeris; *Methylobacterium specialis; Methylobacterium fujisawaense; Methylobacterium tardum; Methylobacterium gnaphalii; Methylobacterium tarhaniae; Methylobacterium goesingense; Methylobacterium thuringiense; Methylobacterium gossipiicola; Methylobacterium trifolii; Methylobacterium gregans; Methylobacterium variabile; Methylobacterium haplocladii; Methylobacterium aminovorans* (Methylorubrum *aminovorans*); *Methylobacterium hispanicum; Methylobacterium extorquens* (Methylorubrum *extorquens*); *Methylobacterium indicum; Methylobacterium podarium* (Methylorubrum *podarium*); *Methylobacterium iners; Methylobacterium populi* (Methylorubrum *populi*); *Methylobacterium isbiliense; Methylobacterium pseudosasae* (Methylorubrum *pseudosasae*); *Methylobacterium jeotgali; Methylobacterium rhodesianum* (Methylorubrum *rhodesianum*); *Methylobacterium komagatae*); *Methylobacterium rhodinum* (Methylorubrum *rhodinum*); *Methylobacterium longum; Methylobacterium salsuginis* (Methylorubrum *salsuginis*); *Methylobacterium marchantiae; Methylobacterium suomiense* (Methylorubrum *suomiense; Methylobacterium mesophilicum; Methylobacterium thiocyanatum* (Methylorubrum *thiocyanatum*); *Methylobacterium nodulans; Methylobacterium zatmanii* (Methylorubrum *zatmanii*); *Methylobacterium organophilum*.

As used herein, the phrase "solid substance" refers to a substance which is insoluble or partially soluble in water or aqueous solutions.

As used herein, the phrase "solid phase that can be suspended therein" refers to a solid substance that can be distributed throughout a liquid by agitation.

As used herein, the term "non-regenerable" refers to either a plant part or processed plant product that cannot be regenerated into a whole plant.

As used herein, the phrase "substantially all of the solid phase is suspended in the liquid phase" refers to media wherein at least 95%, 98%, or 99% of solid substance(s) comprising the solid phase are distributed throughout the liquid by agitation.

As used herein, the phrase "substantially all of the solid phase is not suspended in the liquid phase" refers to media where less than 5%, 2%, or 1% of the solid is in a particulate form that is distributed throughout the media by agitation.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Yield Enhancing *Methylobacterium*, Compositions Comprising Yield Enhancing *Methylobacterium*, Methods of their Use, and Methods of Making Various yield enhancing *Methylobacterium* isolates, compositions comprising these *Methylobacterium*, methods of using the compositions to improve soybean plant yield, and methods of making the compositions are provided herein. In certain embodiments, yield enhancing *Methylobacterium* isolates are selected from NLS0934 (NRRL B-67341), NLS0497 (ISO22), NLS0693 (ISO23), NLS1179 (ISO24), NLS1181 (ISO25), NLS0610 (ISO26), and variants thereof, and a combination of *Methylobacterium* isolate NLS0109 (NRRL B-67340) or a variant thereof, and *Methylobacterium* isolate NLS0017 (B-50931) or NLS0610 (ISO26) or variants thereof. Amounts of the compositions that comprise yield enhancing *Methylobacterium* sufficient to provide for improved soybean plant yield can be determined by measuring any or all of changes in yield relative to untreated plants or plant parts. In certain embodiments, yield can be assessed by measuring output of seed on a per unit area basis (i.e. bushels per acre, kilograms per hectare, and the like), where the yield enhancing *Methylobacterium* treated plants or plants grown from *Methylobacterium* treated seed are grown at about the same density as the control plants. In certain embodiments, yield can be assessed by measuring output on a per plant or per plant part basis (grams of seed per plant, grams of seed per pod, pods per plant, seeds per pod and the like) of the yield enhancing *Methylobacterium* treated plants in comparison to untreated control plants.

Isolated yield enhancing *Methylobacterium* are provided herein. In certain embodiments, the *Methylobacterium* is selected from the group consisting of *M. gregans, M. dankookense, M. radiotolerans, M. komagatae*, and *M. bullatum*. In certain embodiments, the yield enhancing *Methylobacterium* isolate is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof, and combinations thereof. In certain embodiments, the yield enhancing *Methylobacterium* isolate is selected from the group consisting of NLS0934 (NRRL B-67341), NLS1181 (ISO25), and variants thereof. In certain embodiments, the yield enhancing *Methylobacterium* is a combination of *Methylobacterium* isolates NLS0109, and NLS0017 (NRRL B-50931) or NLS0610 (ISO26). In certain embodiments, the yield enhancing *Methylobacterium* isolate can enhance yield when applied to a soybean seed, when applied in vegetative stages of soybean development, or when applied during reproductive stages of soybean development. In certain embodiments, the yield enhancing *Methylobacterium* has a chromosomal genomic DNA with at least 99%, 99.9, 99.8, 99.7, 99.6%, or 99.5% sequence identity to chromosomal genomic DNA of NLS0934 (NRRL B-67341), NLS0497 (ISO22), NLS0693 (ISO23), NLS1179 (ISO24), NLS1181 (ISO25), or NLS0610 (ISO26)); or the yield enhancing *Methylobacterium* is a combination of *Methylobacterium* variants of NLS0109 having chromosomal genomic DNA with at least 99%, 99.9, 99.8, 99.7, 99.6%, or 99.5% sequence identity to chromosomal genomic DNA of NLS0109 (NRRL B-67340), and variants of NLS0017 (NRRL B-50931) or NLS0610 (ISO26) variants having chromosomal genomic DNA with at least 99%, 99.9, 99.8, 99.7, 99.6%, or 99.5% sequence identity to chromosomal genomic DNA of NLS0017 (NRRL B-50931) or NLS0610 (ISO26). In certain embodiments, the yield enhancing *Methylobacterium* provides for at least about 2%, at least about 3%, at least about 4%, at least about 5%, at least about 6%, at least about 7%, at least about 8%, at least about 9%, at least about 10%, or at least about 15% increases in yield of a treated plant or a plant arising from a treated seed in comparison to untreated control plants or plants grown from untreated seeds. In certain embodiments, the yield enhancing *Methylobacterium* provides for at least about 2% or at least about 5% to at least about a 10% or at least about a 20% increase in yield of a treated plant or a plant grown from a treated seed in comparison to untreated control plants or plants arising from untreated seeds.

In certain embodiments, the yield enhancing *Methylobacterium* provides for increased yield when applied to a seed. In certain embodiments, the yield enhancing *Methylobacterium* provides for increases in yield when applied during soybean vegetative stages of development. In certain embodiments, the yield enhancing *Methylobacterium* provides for increased yield when applied just prior to or during soybean reproductive stages of development. In some embodiments, a *Methylobacterium* is applied more than once, wherein such applications can be to a soybean seed and a soybean plant at one or more stages of development, or can be more than one application to a soybean plant at two or more developmental stages. In certain embodiments of any of the aforementioned compositions, the composition comprises a solid substance wherein a mono-culture or co-culture of *Methylobacterium* is adhered thereto. In certain embodiments where the *Methylobacterium* is adhered to a solid substance, the composition comprises a colloid formed by the solid substance wherein a mono-culture or co-culture of *Methylobacterium* is adhered thereto and a liquid. In certain embodiments, the colloid is a gel. In certain embodiments of certain aforementioned compositions, composition is an emulsion that does not contain a solid substance. In certain embodiments of any of the aforementioned compositions, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments of any of the aforementioned compositions, the yield enhancing *Methylobacterium* is a combination of *Methylobacterium* NLS0109, and NLS0017 or NLS0610. In certain embodiments, the yield enhancing *Methylobacterium* has a chromosomal genomic DNA with at least 99%, 99.9, 99.8, 99.7, 99.6%, or 99.5% sequence identity to chromosomal genomic DNA of NLS0934 (NRRL B-67341), NLS0497 (ISO22), NLS0693 (ISO23), NLS1179 (ISO24), NLS1181 (ISO25), or NLS0610 (ISO26); or the yield enhancing *Methylobacterium* is a combination of *Methylobacterium* variants of NLS0109, and NLS0017 or NLS0610 having chromosomal genomic DNA with at least 99%, 99.9, 99.8, 99.7, 99.6%, or 99.5% sequence identity to chromosomal genomic DNA of NLS0109 (NRRL B-67340), NLS0017 (NRRL B-50931) or NLS0610.

In certain embodiments, isolated yield enhancing *Methylobacterium* can be identified by treating a plant, a seed, soil in which the plant or a plant arising from the seed are grown, or other plant growth media in which the plant or a plant arising from the seed are grown and assaying for increased yield.

In certain embodiments, soybean seed or soybeans in the vegetative stages of development are treated with the yield enhancing *Methylobacterium*. The vegetative stages of soybean are as follows: VE (emergence), VC (cotyledon stage), V1 (first trifoliolate leaf), V2 (second trifoliolate leaf), V3 (third trifoliolate leaf), V4 (fourth trifoliate leaf), up to V(n) (nth trifoliolate leaf, where the final number of trifoliate leaves depend on the soybean variety and environmental conditions). A description of the soybean vegetative stages can be found on the world wide web (internet) at extension-.agron.iastate.edu/soybean/production_growthstages.html and in "Soybean Growth and Development", Pedersen, P., Iowa State University Extension and Outreach publication PM 1945 December 2009). In certain embodiments, the yield enhancing *Methylobacterium* are applied at about the VE to about the V4, V5, V6, or Vn stage of development, where n is the number of trifoliate leaves present immediately prior to entering the reproductive stages of development. In certain embodiments, the yield enhancing *Methylobacterium* are applied at about the VC, V1, V2, or V3 to about the V4, V5, V6, or Vn stage of development, where n is the number of trifoliate leaves present immediately prior to entering the reproductive stages of development. In certain embodiments, the yield enhancing *Methylobacterium* that is applied to the seed or during the vegetative stage is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof.

In certain embodiments, the yield enhancing *Methylobacterium* are applied to a transgenic soybean plant that is herbicide, insect or disease tolerant. In certain embodiments, the yield enhancing *Methylobacterium* are applied before, during, or after the application of glyphosate to a transgenic soybean plant that is glyphosate tolerant. Commercially available glyphosate formulations that can be used include, but are not limited to, Roundup Original MAX®, Roundup PowerMAX®, Roundup UltraMax®, or RoundUp WeatherMAX® (Monsanto Co., St. Louis, MO., USA); Touchdown IQ® or Touchdown Total® (Syngenta, Wilmington, Delaware, USA); Glyphomax®, Glyphomax Plus®, or Glyphomax XRT® (Dow Agrosciences LLC, Indianapolis, IN, USA). Soybean plants are typically sprayed with glyphosate at about the V3-V4 vegetative development stage. In certain embodiments, the yield enhancing *Methylobacterium* that is applied before, during, or after the application of glyphosate is a derivative of NLS0934 (NRRL B-67341), NLS0497 (ISO22), NLS0693 (ISO23), NLS1179 (ISO24), NLS1181 (ISO25), or NLS0610 (ISO26)), that is selected for glyphosate resistance. Selections for glyphosate resistant bacteria that have been described (Comai et al., Science 221 (4608): 370-371) can be adapted for selection of yield enhancing *Methylobacterium* that are glyphosate resistant. The selection and use of glyphosate resistant yield enhancing *Methylobacterium* from mutagenized or other populations of *Methylobacterium* such as NLS0934 (NRRL B-67341), NLS0497 (ISO22), NLS0693 (ISO23), NLS1179 (ISO24), NLS1181 (ISO25), or NLS0610 (ISO26), and variants thereof, is provided herein.

In certain embodiments, soybean seed or soybeans in the late vegetative stages to reproductive stages of development are treated with the yield enhancing *Methylobacterium*. The late vegetative stages of soybean are the V5 or V6, to V(n) (nth trifoliolate leaf, where the final number of trifoliate leaves depend on the soybean variety and environmental conditions) stages. The reproductive stages of soybean development are: R1 (beginning flowering—at least one flower on any node); R2 (full flowering—an open flower at one of the two uppermost nodes); R3 (beginning pod—pods are 5 mm at one of the four uppermost nodes); R4 (full pod—pods at 2 cm at one of the four uppermost nodes); R5 (Beginning seed—seed is 3 mm long in the pod at one of the four uppermost nodes on the main stem); R6 (full seed—pod containing a green seed that fills the pod capacity at one of the four uppermost nodes on the main stem); R7 (beginning maturity—one normal pod on the main stem has reached its mature pod color); and R8 (full maturity—95% of the pods have reached their full mature color. In certain embodiments, the yield enhancing *Methylobacterium* that is applied to late vegetative or reproductive stage is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof, and a combination of *Methylobacterium* NLS0109, and NILS0017 or NILS0610, and variants thereof.

Various *Methylobacterium* isolates provided herein are disclosed in Table 1.

TABLE 1

*Methylobacterium* isolates

| Deposit Identifier | ISOLATE No. | NLS No. | USDA ARS NRRL No.[1] |
|---|---|---|---|
| *Methylobacterium* sp. #1 | ISO01 | NLS0046 | NRRL B-50929 |
| *Methylobacterium* sp. #2 | ISO02 | NLS0020 | NRRL B-50930 |
| *Methylobacterium* sp. #3 | ISO03 | NLS0017 | NRRL B-50931 |
| *Methylobacterium* sp. #4 | ISO04 | NLS0042 | NRRL B-50932 |
| *Methylobacterium* sp. #5 | ISO05 | NLS0089 | NRRL B-50933 |
| *Methylobacterium* sp. #6 | ISO06 | NLS0068 | NRRL B-50934 |
| *Methylobacterium* sp. #7 | ISO07 | NLS0065 | NRRL B-50935 |
| *Methylobacterium* sp. #8 | ISO08 | NLS0069 | NRRL B-50936 |
| *Methylobacterium* sp. #9 | ISO09 | NLS0062 | NRRL B-50937 |
| *Methylobacterium* sp. #10 | ISO10 | NLS0064 | NRRL B-50938 |
| *Methylobacterium* sp. #11 | ISO11 | NLS0021 | NRRL B-50939 |
| *Methylobacterium* sp. #12 | ISO12 | NLS0066 | NRRL B-50940 |
| *Methylobacterium* sp. #13 | ISO13 | NLS0037 | NRRL B-50941 |
| *Methylobacterium* sp. #14 | ISO14 | NLS0038 | NRRL B-50942 |
| *Methylobacterium* #16 | ISO16 | NLS0109 | NRRL B-67340 |
| *Methylobacterium* #17 | ISO17 | NLS0934 | NRRL B-67341 |
| *Methylobacterium* sp #22 | ISO22 | NLS0497 | NRRL B-67925 |
| *Methylobacterium* sp #23 | ISO23 | NLS0693 | NRRL B-67926 |
| *Methylobacterium* sp #24 | ISO24 | NLS1179 | NRRL B-67929 |
| *Methylobacterium* sp #25 | ISO25 | NLS1181 | NRRL B-67927 |
| *Methylobacterium* sp #26 | ISO26 | NLS0610 | NRRL B-67892 |

[1]Deposit number for strain deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. Subject to 37 CFR §1.808(b), all restrictions imposed by the depositor on the availability to the public of the deposited material will be irrevocably removed upon the granting of any patent from this patent application.

Variants of a *Methylobacterium* isolate listed in Table 1 include derivatives obtained therefrom by genetic transformation, mutagenesis and/or insertion of a heterologous sequence. In some embodiments, such variants are identified by the presence of chromosomal genomic DNA with at least 99%, 99.9, 99.8, 99.7, 99.6%, or 99.5% sequence identity to chromosomal genomic DNA of the strain from which it was derived. In certain embodiments, derivatives and other variants are distinguished by the presence of one or more unique DNA sequences that include: (i) a unique sequence of SEQ ID NOs: 1-15 and SEQ ID NOs: 61-79. Specific assays and primer sequences that use such sequences for specific detection of *Methylobacterium* strains from isolated DNA or various samples from treated plants are described in the examples herein, and in WO2020010264.

Co-assigned patents or patent applications that disclose additional specific uses of certain *Methylobacterium* strains of Table 1 such as: increasing corn yield (US20160295868); improving lettuce cultivation (U.S. Pat. No. 10,212,939); improving tomato growth (U.S. Pat. No. 10,368,547); improving soybean yield (US2016/0302423); improving fruit production (U.S. Pat. No. 10,111,438); controlling corn rootworm (US20170238553); controlling root lesion nematodes (U.S. Pat. No. 10,448,645); controlling root knot nematodes (U.S. Pat. No. 10,098,353); and controlling fungal disease (US20180295841 and US20190364905) are each incorporated herein by reference in their entireties.

Also provided herein are methods for improving soybean yield that comprise applying any of the aforementioned compositions provided herein to a plant or a plant part in an amount that provides for increased soybean yield in the plant, plant part, or a plant obtained therefrom relative to infection of a control plant, plant part, or plant obtained therefrom that had not received an application of the composition. In certain embodiments, the plant part is selected from the group consisting of a leaf, a stem, a flower, a root, a pod, a coleoptile and a seed. In certain embodiments, the method further comprises the step of harvesting at least one plant part selected from the group consisting of a leaf, a stem, a flower, a root, a pod, or a seed from the plant or plant part. In certain embodiments of any of the aforementioned methods, the methods further comprise obtaining a processed food or feed composition from the plant or plant part. In certain embodiments, the processed food or feed composition is a meal or a paste. In certain embodiments of any of the aforementioned methods, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments of any of the aforementioned compositions, the yield enhancing *Methylobacterium* is a combination of *Methylobacterium* NLS0109, and NLS0017 or NLS0610, or variants thereof.

Also provided are methods of making the compositions useful for improving soybean yield that comprise combining a yield enhancing *Methylobacterium* with an agriculturally acceptable excipient and/or with an agriculturally acceptable adjuvant. In certain embodiments of the methods, the *Methylobacterium* is adhered to a solid substance. In certain embodiments of the methods, the *Methylobacterium* is adhered to a solid substance, where the solid substance is combined with a liquid to form a composition that is a colloid. In certain embodiments of the methods, the colloid is a gel. In certain embodiments of the methods, *Methylobacterium* adhered to a solid substance is provided by culturing the *Methylobacterium* in the presence of the solid substance. In certain embodiments of the methods, the composition comprises an emulsion. In certain embodiments of the methods, the *Methylobacterium* is provided by culturing the *Methylobacterium* in an emulsion. In certain embodiments of any of the aforementioned methods, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments of any of the aforementioned compositions, the yield enhancing *Methylobacterium* is a combination of *Methylobacterium* NLS0109, and NLS0017 or NLS0610, or variants thereof.

Methods where *Methylobacterium* are cultured in biphasic media comprising a liquid phase and a solid substance have been found to significantly increase the resultant yield of *Methylobacterium* relative to methods where the *Methylobacterium* are cultured in liquid media alone. In certain embodiments, the methods can comprise growing the *Methylobacterium* in liquid media with a particulate solid substance that can be suspended in the liquid by agitation under conditions that provide for *Methylobacterium* growth. In certain embodiments where particulate solid substances are used, at least substantially all of the solid phase can thus be suspended in the liquid phase upon agitation. Such particulate solid substances can comprise materials that are about 1 millimeter or less in length or diameter. In certain embodiments, the degree of agitation is sufficient to provide for uniform distribution of the particulate solid substance in the liquid phase and/or optimal levels of culture aeration. However, in other embodiments provided herein, at least substantially all of the solid phase is not suspended in the liquid phase, or portions of the solid phase are suspended in the liquid phase and portions of the solid phase are not suspended in the liquid phase. Non-particulate solid substances can be used in certain biphasic media where the solid phase is not suspended in the liquid phase. Such non-particulate solid substances include, but are not limited to, materials that are greater than about 1 millimeter in length or diameter. Such particulate and non-particulate solid substances also include, but are not limited to, materials that are porous, fibrous, or otherwise configured to provide for increased surface areas for adherent growth of the *Methylobacterium*. Biphasic media where portions of the solid phase are suspended in the liquid phase and portions of the solid phase are not suspended in the liquid phase can comprise a mixture of particulate and non-particulate solid substances. Such particulate and non-particulate solid substances used in any of the aforementioned biphasic media also include, but are not limited to, materials that are porous, fibrous, or otherwise configured to provide for increased surface areas for adherent growth of the *Methylobacterium*. In certain embodiments, the media comprises a colloid formed by a solid and a liquid phase. A colloid comprising a solid and a liquid can be pre-formed and added to liquid media or can be formed in media containing a solid and a liquid. Colloids comprising a solid and a liquid can be formed by subjecting certain solid substances to a chemical and/or thermal change. In certain embodiments, the colloid is a gel. In certain embodiments, the liquid phase of the media is an emulsion. In certain embodiments, the emulsion comprises an aqueous liquid and a liquid that is not miscible, or only partially miscible, in the aqueous liquid. Liquids that are not miscible, or only partially miscible, in water include, but are not limited to, any of the following: (1) liquids having a miscibility in water that is equal to or less than that of pentanol, hexanol, or heptanol at 25 degrees C.; (2) liquids comprising an alcohol, an aldehyde, a ketone, a fatty acid, a phospholipid, or any combination thereof; (3) alcohols selected from the group consisting of aliphatic alcohols containing at least 5 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible liquid can comprise at least about 0.02% to about 20% of the liquid phase by mass. In certain embodiments, the methods can comprise obtaining a biphasic culture media comprising the liquid, the solid, and *Methylobacterium* and incubating the culture under conditions that provide for growth of the *Methylobacterium*. Biphasic culture medias comprising the liquid, the solid, and *Methylobacterium* can be obtained by a variety of methods that include, but are not limited to, any of: (a) inoculating a biphasic media comprising the liquid and the solid substance with *Methylobacterium*; (b) inoculating the solid substance with *Methylobacterium* and then introducing the solid substance comprising the *Methylobacterium* into the liquid media; (c) inoculating the solid substance with *Methylobacterium*, incubating the *Methylobacterium* on the solid substance, and then introducing the solid substance comprising the *Methylobacterium* into the liquid media; or (d) any combination of (a), (b), or (c). Methods and compositions for growing *Methylobacterium* in biphasic media comprising a liquid and a solid are disclosed in co-assigned U.S. Pat. Nos. 9,181,541 and 9,845,462, which are incorporated herein by reference in their entirety, and in co-assigned International Patent Publication WO2013181610, published Dec. 5, 2013, which is incorporated herein by reference in its entirety.

Methods where *Methylobacterium* are cultured in media comprising an emulsion have also been found to significantly increase the resultant yield of *Methylobacterium* relative to methods where the *Methylobacterium* are cultured in liquid media alone. In certain embodiments, the methods for making the compositions provided herein can comprise growing the yield enhancing *Methylobacterium* in an emulsion under conditions that provide for *Methylobacterium* growth. Medias comprising the emulsion and yield enhancing *Methylobacterium* can be obtained by a variety of methods that include, but are not limited to, any of: (a) inoculating a media comprising the emulsion with *Methylobacterium*; (b) inoculating the aqueous liquid with the *Methylobacterium*, introducing the non-aqueous liquid, and mixing to form an emulsion; (c) inoculating the aqueous liquid with the *Methylobacterium*, introducing the non-aqueous liquid, and mixing to form an emulsion; or (d) any combination of (a), (b), or (c). In certain embodiments, the emulsion comprises an aqueous liquid and a liquid that is not miscible, or only partially miscible, in the aqueous liquid. Non-aqueous liquids that are not miscible, or only partially miscible, in water include, but are not limited to, any of the following: (1) liquids having a miscibility in water that is equal to or less than that of n-pentanol, n-hexanol, or n-heptanol at 25 degrees C.; (2) liquids comprising an alcohol, an aldehyde, a ketone, a fatty acid, a phospholipid, or any combination thereof; (3) alcohols is selected from the group consisting of aliphatic alcohols containing at least 5, 6, or 7 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible non-aqueous liquid can comprise at least about 0.02% to about 20% of the emulsion by mass. In certain embodiments, the immiscible or partially immiscible non-aqueous liquid can comprise at least about any of about 0.05%, 0.1%, 0.5%, or 1% to about 3%, 5%, 10%, or 20% of the emulsion by mass. Methods and compositions for growing *Methylobacterium* in media comprising an emulsion are disclosed in co-assigned U.S. Pat. No. 10,287,544 and International Patent Publication WO2014194189, published Dec. 4, 2014, which are incorporated herein by reference in their entireties.

In some embodiments, the composition or method disclosed herein may comprise one or more additional components. In some embodiments an additional component can be an additional active ingredient, for example, a pesticide or a second biological. The pesticide may be, for example, an insecticide, a fungicide, an herbicide, or a nematicide. The second biological can be a biocontrol agent.

Non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. In particular embodiments insecticides and nematicides include abamectin, aldicarb, aldoxycarb, bifenthrin, carbofuran, chlorantraniliporle, chlothianidin, cyfluthrin, cyhalothrin, cypermethrin, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, tioxazafen, spinetoram, spinosad, spirodichlofen, spirotetramat, tefluthrin, thiacloprid, thiamethoxam, and thiodicarb.

Non-limiting examples of useful fungicides include aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Particular examples of fungicides include acibenzolar-S-methyl, azoxystrobin, benalaxyl, bixafen, boscalid, carbendazim, cyproconazole, dimethomorph, epoxiconazole, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thifluzamide, thiophanate, tolclofos-methyl, trifloxystrobin, and triticonazole.

Non-limiting examples of herbicides include ACCase inhibitors, acetanilides, AHAS inhibitors, carotenoid biosynthesis inhibitors, EPSPS inhibitors, glutamine synthetase inhibitors, PPO inhibitors, PS II inhibitors, and synthetic auxins. Particular examples of herbicides include acetochlor, clethodim, dicamba, flumioxazin, fomesafen, glyphosate, glufosinate, mesotrione, quizalofop, saflufenacil, sulcotrione, and 2,4-D.

In some embodiments, compositions or methods disclosed herein may comprise an additional active ingredient which may be an additional biological. The additional biological could be a biocontrol agent, other beneficial microorganisms, microbial extracts, natural products, plant growth activators or a plant defense agent. Non-limiting examples of biocontrol agents include bacteria, fungi, beneficial nematodes, and viruses.

In certain embodiments, an additional biological can be *Methylobacterium*. In certain embodiments, the additional biological is a *Methylobacterium* listed in Table 1, or variants thereof. Thus, compositions or methods comprised herein can comprise two or more of NLS0934 (NRRL B-67341), NLS0497 (ISO22), NLS0693 (ISO23), NLS1179 (ISO24), NLS1181 (ISO25), NLS0610 (ISO26), or variants thereof. In certain embodiments, an additional biological is selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), ISO14 (NRRL B-50942), ISO16 (NRRL B-67340), and variants thereof. In certain embodiments, the aforementioned variant thereof can be a *Methylobacterium* having chromosomal genomic DNA with at least 99%, 99.9, 99.8, 99.7, 99.6%, or 99.5% sequence identity to chromosomal genomic DNA of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), ISO14 (NRRL B-50942) or ISO16 (NRRL B-67340). In certain embodiments, an additional biological can be a *Methylobacterium* selected from *M. gregans, M. radiotolerans, M. extorquens, M. populi, M. salsuginis, M. brachiatum*, and *M. komagatae*.

In certain embodiments, the additional biological can be a bacterium of the genus Actinomycetes, *Agrobacterium, Arthrobacter, Alcaligenes*, Aureobacterium, Azobacter, *Beijerinckia, Bacillus, Brevibacillus, Burkholderia, Chromobacterium, Clostridium, Clavibacter, Comomonas, Corynebacterium, Curtobacterium, Enterobacter, Flavobacterium, Gluconobacter, Hydrogenophage, Klebsiella, Methylobacterium, Paenibacillus, Pasteuria*, Phingobacterium, *Photorhabdus, Phyllobacterium, Pseudomonas, Rhizobium, Bradyrhizobium, Serratia, Stenotrophomonas, Variovorax*, or *Xenorhadbus*. In particular embodiments the bacteria is selected from the group consisting of *Bacillus amyloliquefaciens, Bacillus cereus, Bacillus firmus, Bacillus lichenformis, Bacillus pumilus, Bacillus sphaericus, Bacillus subtilis, Bacillus thuringiensis, Chromobacterium* suttsuga, *Pasteuria penetrans, Pasteuria* usage, and Pseudomona *fluorescens*.

In certain embodiments the additional biological can be a fungus of the genus *Alternaria, Ampelomyces, Aspergillus, Aureobasidium, Beauveria, Colletotrichum, Coniothyrium, Gliocladium*, Metarhisium, *Muscodor*, Paecilonyces, *Trichoderma, Typhula, Ulocladium*, or Verticilium. In particular embodiments the fungus is *Beauveria bassiana, Coniothyrium minitans, Gliocladium* vixens, *Muscodor albus, Paecilomyces lilacinus*, or *Trichoderma polysporum*.

In further embodiments the additional biological can be a nodulation related factor, plant growth activator or plant defense agent including, but not limited to harpin, *Reynou-* tria sachalinensis, jasmonate, lipochitooligosaccharides (LCO), and isoflavones. In certain embodiments, additional biological components can include a combination of a bacterium and a nodulation related factor, plant growth activator or plant defense agent. One such combination includes, but not limited to, Optimize®, a combination of *Bradyrhizobium japonicum* and LCO.

In further embodiments, the additional biological can include, but is not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis, Bacillus thuringiensis, Bacillus pumilis, Pseudomonas syringae, Trichoderma harzianum, Trichoderma virens*, and *Streptomyces lydicus* strains. Other microorganisms that are added can be genetically engineered or wild-type isolates that are available as pure cultures. In certain embodiments, it is anticipated that the biological or biocontrol agent can be provided in the fermentation broth, fermentation broth product, or composition in the form of a spore.

In certain embodiments, the fermentation broth, fermentation broth product, or compositions that comprise yield enhancing *Methylobacterium* can further comprise one or more introduced additional active ingredients or microorganisms of pre-determined identity other than *Methylobacterium*.

In certain embodiments, the liquid culture medium is prepared from inexpensive and readily available components, including, but not limited to, inorganic salts such as potassium phosphate, magnesium sulfate and the like, carbon sources such as glycerol, methanol, glutamic acid, aspartic acid, succinic acid and the like, and amino acid blends such as peptone, tryptone, and the like. Exemplary liquid media that can be used include, but are not limited to, ammonium mineral salts (AMS) medium (Whittenbury et al., 1970), Vogel-Bonner (VB) minimal culture medium (Vogel and Bonner, 1956), and LB broth ("Luria-Bertani Broth").

In general, a solid substance that can be used in the methods and compositions to provide for the efficient growth of *Methylobacterium* can be any suitable solid substance which is insoluble or only partially soluble in water or aqueous solutions. Such suitable solid substances are also non-bacteriocidal or non-bacteriostatic with respect to yield enhancing *Methylobacterium* when the solid substances are provided in the liquid culture media. In certain embodiments, such suitable solid substances are also solid substances that are readily obtained in sterile form or rendered sterile. Solid substances can be sterilized by any method that provides for removal of contaminating microorganisms and thus include, but are not limited to, methods such as autoclaving, irradiation, chemical treatment, and any combination thereof. These solid substances include natural substances of animal, plant, microbial, fungal, or mineral origin, manmade substances, or combinations of natural and manmade substances. In certain embodiments, solid substances are inanimate solid substances. Inanimate solid substances of animal, plant, microbial, or fungal origin can be obtained from animals, plants, microbes, or fungi that are inviable (i.e. no longer living) or that have been rendered inviable. Diatom shells are thus inanimate solid substances when previously associated diatom algae have been removed or otherwise rendered inviable. Since diatom shells are inanimate solid substances, they are not considered to be photosynthetic organisms or photosynthetic microorganisms. In certain embodiments, solid substances include, but are not limited to, sand, silt, soil, clay, ash, charcoal, diatomaceous earth and other similar minerals, ground glass or glass beads, ground ceramic materials, ceramic beads, bentonite, kaolin, talc, perlite, mica, vermiculite, silicas, quartz powder, montmorillonite, and combinations thereof. In certain embodiments, a solid substance can be a polymer or polymeric beads. Polymers that can be used as a solid substance include, but are not limited to, various polysaccharides such as cellulosic polymers and chitinous polymers which are insoluble or only partially soluble in water or aqueous solutions, agar (i.e. galactans), and combinations thereof. In certain embodiments, a solid substance can be an insoluble or only partially soluble salt crystal. Salt crystals that can be used include, but are not limited to, insoluble or only partially soluble carbonates, chromates, sulfites, phosphates, hydroxides, oxides, and sulfides. In certain embodiments, a solid substance can be a microbial cell, fungal cell, microbial spore, or fungal spore. In certain embodiments, a solid substance can be a microbial cell or microbial spore wherein the microbial cell or microbial spore is not a photosynthetic microorganism. In certain embodiments, the microbial cell or microbial spore is not a photosynthetic microorganism, where the photosynthetic microorganism is selected from the group consisting of algae, cyanobacteria, diatoms, *Botryococcus braunii, Chlorella, Dunaliella tertiolecta, Gracilaria, Pleurochrysis carterae*, Sargassum, and Ulva. In still other embodiments, a solid substance can be an inactivated (i.e. inviable) microbial cell, fungal cell, microbial spore, or fungal spore. In still other embodiments, a solid substance can be a quiescent (i.e. viable but not actively dividing) microbial cell, fungal cell, microbial spore, or fungal spore. In still other embodiments, a solid substance can be cellular debris of microbial origin. In still other embodiments, a solid substance can be particulate matter from any part of a plant. Plant parts that can be used to obtain a solid substance include, but are not limited to, cobs, husks, hulls, leaves, roots, flowers, stems, barks, seeds, and combinations thereof. Products obtained from processed plant parts including, but not limited to, bagasse, wheat bran, soybean grits, crushed seed cake, stover, and the like can also be used. Such plant parts, processed plants, and/or processed plant parts can be milled to obtain a solid material in a particulate form that can be used. In certain embodiments, wood or a wood product including, but not limited to, wood pulp, sawdust, shavings, and the like can be used. In certain embodiments, a solid substance can be a particulate matter from an animal(s), including, but not limited to, bone meal, gelatin, ground or powdered shells, hair, macerated hide, and the like.

In certain embodiments, a solid substance is provided in a particulate form that provides for distribution of the solid substance in the culture media. In certain embodiments, a solid substance is comprised of particle of about 2 microns to about 1000 microns in average length or average diameter. In certain embodiments, a solid substance is comprised of particle of about 1 micron to about 1000 microns in average length or average diameter. In certain embodiments, a solid substance is a particle of about 1, 2, 4, 10, 20, or 40 microns to any of about 100, 200, 500, 750, or 1000 microns in average length or average diameter. Desirable characteristics of particles used in the methods and compositions provided herein include suitable wettability such that the particles can be suspended throughout the media upon agitation.

In certain embodiments, a solid substance is provided in the media as a colloid wherein the continuous phase is a liquid and the dispersed phase is the solid. Suitable solids that can be used to form colloids in liquid media used to grow yield enhancing *Methylobacterium* include, but are not limited to, various solids that are referred to as hydrocolloids. Such hydrocolloids used in the media, methods and compositions provided herein can be hydrophilic polymers, of plant, animal, microbial, or synthetic origin. Hydrocolloid polymers used in the methods can contain many hydroxyl groups and/or can be polyelectrolytes. Hydrocolloid polymers used in the compositions and methods provided herein include, but are not limited to, agar, alginate, arabinoxylan, carrageenan, carboxymethylcellulose, cellulose, curdlan, gelatin, gellan, β-glucan, guar gum, gum arabic, locust bean gum, pectin, starch, xanthan gum, and mixtures thereof. In certain embodiments, a colloid used in the media, methods, and compositions provided herein can comprise a hydrocolloid polymer and one or more proteins.

In certain embodiments, a solid substance can provide for adherent growth of the yield enhancing *Methylobacterium* on the solid substance. Yield enhancing *Methylobacterium* that are adhered to a solid substance are *Methylobacterium* that cannot be substantially removed by simply washing the solid substance with the adherent yield enhancing *Methylobacterium* with growth media whereas non-adherent *Methylobacterium* can be substantially removed by washing the solid substance with liquid growth media. In this context, "substantially removed" means that at least about 30%, 40%, 50%, 60%, 70%, or 80% the *Methylobacterium* present are removed when the solid substance is washed with three volumes of liquid growth media. Such washing can be effected by a variety of methods including, but not limited to, decanting liquid from a washed solid phase or passing liquid through a solid phase on a filter that permits flow through of bacteria in the liquid. In certain embodiments, the adherent yield enhancing *Methylobacterium* that are associated with the solid can include both *Methylobacterium* that are directly attached to a solid and/or *Methylobacterium* that are indirectly attached to a solid substance. *Methylobacterium* that are indirectly attached to a solid substance include, but are not limited to, *Methylobacterium* that are attached to another *Methylobacterium* or to another microorganism that is attached to the solid substance, *Methylobacterium* that are attached to a solid substance by being attached to another substance that is attached to the solid substance, and the like. In certain embodiments, at least 10%, 20%, 30%, 40%, 50%, 60%, 70%, 80%, 90%, 95%, 98%, 99%, 99.5% or 99.9% of the *Methylobacterium* in the fermentation broth, fermentation broth product, or compositions are *Methylobacterium* that are adhered to a solid substance. In certain embodiments, adherent yield enhancing *Methylobacterium* can be present on the surface of a solid substance in the fermentation broth, fermentation broth product, or composition at a density of at least about 1 *Methylobacterium*/20 square micrometers, of at least about 1 *Methylobacterium*/10 square micrometers, of at least about 1 *Methylobacterium*/10 square micrometers, of at least about 1 *Methylobacterium*/5 square micrometers, of at least about 1 *Methylobacterium*/2 square micrometers, or of at least about 1 *Methylobacterium*/square micrometer. In certain embodiments, adherent yield enhancing *Methylobacterium* can be present on the surface of a solid substance in the fermentation broth, fermentation broth product, or composition at a density of at least about 1 *Methylobacterium*/20 square micrometers to about 1 *Methylobacterium*/square micrometer, of at least about 1 *Methylobacterium*/10 square micrometers to about 1 *Methylobacterium*/square micrometer, of at least about 1 *Methylobacterium*/10 square micrometers to about 1 *Methylobacterium*/square micrometer, of at least about 1 *Methylobacterium*/5 square micrometers to about 1 *Methylobacterium*/square micrometer, or of at least about 1 *Methylobacterium*/2 square micrometers to about 1 *Methylobacterium*/square micrometer. In certain embodiments, adherent yield enhancing *Methylobacterium* can be present on the surface of a solid substance in the fermentation broth, fermentation broth product, or composition at a density of at least about 1 *Methylobacterium*/20 square micrometers to about 1 *Methylobacterium*/2 square micrometers, of at least about 1 *Methylobacterium*/10 square micrometers to about 1 *Methylobacterium*/2 square micrometers, of at least about 1 *Methylobacterium*/10 square micrometers to about 1 *Methylobacterium*/2 square micrometers, or of at least about 1 *Methylobacterium*/5 square micrometers to about 1 *Methylobacterium*/2 square micrometers. Biphasic fermentation broths provided herein can comprise a liquid phase that contains non-adherent *Methylobacterium*. In certain embodiments, titers of non-adherent *Methylobacterium* in the liquid phase can be less than about 100,000, 10,000, or 1,000 colony forming units (CFU) per ml. In certain embodiments of any of the aforementioned compositions, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments of any of the aforementioned compositions, the yield enhancing *Methylobacterium* is selected from the group consisting of NLS0934 (NRRL B-67341), NLS1181 (ISO25), and variants thereof. In certain embodiments of any of the aforementioned compositions, the yield enhancing *Methylobacterium* is a combination of *Methylobacterium* NLS0109 and NLS0017, or variants thereof.

Fermentation broths and compositions with yield enhancing *Methylobacterium* at a titer of greater than about $5\times10^8$ colony-forming units per milliliter, at a titer of greater than about $1\times10^9$ colony-forming units per milliliter, at a titer of greater than about $1\times10^{10}$ colony-forming units per milliliter, at a titer of at least about $3\times10^{10}$ colony-forming units per milliliter are provided herein. In certain embodiments, fermentation broths and compositions provided herein can comprise yield enhancing *Methylobacterium* at a titer of at least about $5\times10^8$ colony-forming units per milliliter to at least about $3\times10^{10}$ colony-forming units per milliliter, at least about $5\times10^8$ colony-forming units per milliliter to at least about $4\times10^{10}$ colony-forming units per milliliter, or at least about $5\times10^8$ colony-forming units per milliliter to at least about $6\times10^{10}$ colony-forming units per milliliter. In certain embodiments, fermentation broths provided herein can comprise yield enhancing *Methylobacterium* at a titer of at least about $1\times10^9$ colony-forming units per milliliter to at least about $3\times10^{10}$ colony-forming units per milliliter, at least about $1\times10^9$ colony-forming units per milliliter to at least about $4\times10^{10}$ colony-forming units per milliliter, or at least about $1\times10^9$ colony-forming units per milliliter to at least about $6\times10^{10}$ colony-forming units per milliliter. In certain embodiments, fermentation broths provided herein will comprise yield enhancing *Methylobacterium* at a titer of at least about $1\times10^{10}$ colony-forming units per milliliter to at least about $3\times10^{10}$ colony-forming units per milliliter, at least about $1\times10^{10}$ colony-forming units per milliliter to at least about $4\times10^{10}$ colony-forming units per milliliter, or at least about $1\times10^{10}$ colony-forming units per milliliter to at least about $6\times10^{10}$ colony-forming units per milliliter. In certain embodiments, fermentation broths provided herein will comprise yield enhancing *Methylobacterium* at a titer of, at least about $3\times10^{10}$ colony-forming units per milliliter to at least about $4\times10^{10}$ colony-forming units per milliliter, or at least about $3\times10^{10}$ colony-forming units per milliliter to at least about $6\times10^{10}$ colony-forming units per milliliter. In certain embodiments of any of the aforementioned compositions, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments of any of the aforementioned compositions, the yield enhancing *Methylobacterium* is a combination of *Methylobacterium* NLS0109 and NLS0017, or variants thereof.

Yield enhancing *Methylobacterium* can be obtained as fermentation products and used to make various compositions useful for treating plants or plant parts to improve soybean yield. The *Methylobacterium* compositions can be applied to plants or plant parts in various forms, including for example as liquid compositions or as dried compositions, for example dried powders. Dried powders can be obtained by various methods, including for example, by spray-drying, freeze-drying, vacuum-drying, air-drying and fluidized bed-drying. Plants or plant parts that have been at least partially coated or coated with the fermentation broth products or compositions comprising yield enhancing *Methylobacterium* are thus provided. In certain embodiments, the plant part is a seed. Partial coating of a plant, a plant part, such as a seed includes, but is not limited to coating at least about 5%, 10%, 20%, 30%, 40%, 50%, 60%, 70%, 80%, 90%, 95%, 98%, 99%, or about 99.5% of the surface area of the plant, plant part, or plant seed. Also provided are processed plant products that contain the fermentation broth products or compositions with yield enhancing *Methylobacterium* or adherent yield enhancing *Methylobacterium*. In some embodiments, solid substances with adherent yield enhancing *Methylobacterium* can be used to make various compositions that are particularly useful for treating plant seeds. Seeds that have been at least partially coated with the fermentation broth products or compositions are thus provided. Partial coating of a seed includes, but is not limited to coating at least about 5%, 10%, 20%, 30%, 40%, 50%, 60%, 70%, 80%, 90%, 95%, 98%, 99%, or about 99.5% of the surface area of the seed. Also provided are processed seed products, including, but not limited to, meal, flour, feed, and flakes that contain the fermentation broth products or compositions provided herein. In certain embodiments, the processed plant product will be non-regenerable (i.e. will be incapable of developing into a plant). In certain embodiments, the solid substance used in the fermentation product or composition that at least partially coats the plant or plant part or that is contained in the processed plant or plant part product comprises a solid substance and associated or adherent yield enhancing *Methylobacterium* that can be readily identified by comparing a treated and an untreated plant or plant part, or processed product thereof. In certain embodiments, the yield enhancing *Methylobacterium* is selected from the group consisting of NLS0934 (NRRL B-67341), NLS0497 (ISO22), NLS0693 (ISO23), NLS1179 (ISO24), NLS1181 (ISO25), NLS0610 (ISO26), and variants thereof. In certain embodiments, the yield enhancing *Methylobacterium* is selected from the group consisting of NLS0934 (NRRL B-67341) and/or NLS1181 (ISO25). In certain embodiments of any of the aforementioned compositions, the yield enhancing *Methylobacterium* is a combination of *Methylobacterium* NLS0109, and NLS0017 or NLS0610, or variants thereof.

Compositions useful for treating plants or plant parts that comprise yield enhancing *Methylobacterium* can also further comprise additional components, including an active ingredient, an agriculturally acceptable adjuvant or an agriculturally acceptable excipient. An agriculturally acceptable adjuvant or an agriculturally acceptable excipient is typically an ingredient that does not cause undue phytotoxicity or other adverse effects when exposed to a plant or plant part. In certain embodiments, a solid substance used in a fermentation broth can itself be an agriculturally acceptable adjuvant or an agriculturally acceptable excipient so long as it is not bacteriocidal or bacteriostatic to the *Methylobacterium*. In some embodiments agriculturally acceptable adjuvants and/or excipients are added to *Methylobacterium* to increase stability and/or shelf life. In other embodiments, the composition further comprises at least one of an agriculturally acceptable adjuvant or an agriculturally acceptable excipient.

Any of the aforementioned compositions can also further comprise an additional active ingredient. In certain embodiments, the additional active ingredient is a pesticide used in the composition that does not substantially inhibit growth of the *Methylobacterium*. As *Methylobacterium* are gram negative bacteria, suitable bacteriocides used in the compositions can include, but are not limited to, bacteriocides that exhibit activity against gram positive bacteria but not gram negative bacteria. Compositions provided herein can also comprise a bacteriostatic agent that does not substantially inhibit growth of the *Methylobacterium*. Bacteriostatic agents suitable for use in compositions provided herein include, but are not limited to, those that exhibit activity against gram positive bacteria but not gram negative bacteria. Any of the aforementioned compositions can also be an essentially dry product (i.e. having about 5% or less water content), a mixture of the composition with an emulsion, or a suspension.

Agriculturally acceptable adjuvants used in the compositions that comprise yield enhancing *Methylobacterium* include, but are not limited to, components that enhance product efficacy and/or products that enhance ease of product application. Adjuvants that enhance product efficacy can include various wetters/spreaders that promote adhesion to and spreading of the composition on plant parts, stickers that promote adhesion to the plant part, penetrants that can promote contact of the active agent with interior tissues, extenders that increase the half-life of the active agent by inhibiting environmental degradation, and humectants that increase the density or drying time of sprayed compositions. Wetters/spreaders used in the compositions can include, but are not limited to, non-ionic surfactants, anionic surfactants, cationic surfactants, amphoteric surfactants, organo-silicate surfactants, and/or acidified surfactants. Stickers used in the compositions can include, but are not limited to, latex-based substances, terpene/pinolene, and pyrrolidone-based substances. Penetrants can include mineral oil, vegetable oil, esterified vegetable oil, organo-silicate surfactants, and acidified surfactants. Extenders used in the compositions can include, but are not limited to, ammonium sulphate, or menthene-based substances. Humectants used in the compositions can include, but are not limited to, glycerol, propylene glycol, and diethyl glycol. Adjuvants that improve ease of product application include, but are not limited to, acidifying/buffering agents, anti-foaming/de-foaming agents, compatibility agents, drift-reducing agents, dyes, and water conditioners. Anti-foaming/de-foaming agents used in the compositions can include, but are not limited to, dimethopolysiloxane. Compatibility agents used in the compositions can include, but are not limited to, ammonium sulphate. Drift-reducing agents used in the compositions can include, but are not limited to, polyacrylamides, and polysaccharides. Water conditioners used in the compositions can include, but are not limited to, ammonium sulphate.

Methods of treating plants and/or plant parts with the fermentation broths, fermentation broth products, and compositions comprising yield enhancing *Methylobacterium* are also provided herein. Treated plants, and treated plant parts obtained therefrom, include, but are not limited to, soybean. As used herein, the term soybean includes, but is not limited to all varieties, subspecies, and cultivars of *Glycine max*. Soybean subspecies include, but are not limited to, *Glycine max* L. ssp. max and *Glycine max* ssp. *Formosana*. Plant parts that are treated include, but are not limited to, leaves, stems, flowers, roots, seeds, pods, and the like. Seeds or other propagules of any of the aforementioned plants can be treated with the fermentation broths, fermentation broth products, fermentation products, and/or compositions provided herein.

In certain embodiments, plants and/or plant parts are treated by applying the fermentation broths, fermentation broth products, fermentation products, and compositions that comprise yield enhancing *Methylobacterium* as a spray. Such spray applications include, but are not limited to, treatments of a single plant part or any combination of plant parts. Spraying can be achieved with any device that will distribute the fermentation broths, fermentation broth products, fermentation products, and compositions to the plant and/or plant part(s). Useful spray devices include a boom sprayer, a hand or backpack sprayer, crop dusters (i.e. aerial spraying), and the like. Spraying devices and or methods providing for application of the fermentation broths, fermentation broth products, fermentation products, and compositions to either one or both of the adaxial surface and/or abaxial surface can also be used. Plants and/or plant parts that are at least partially coated with any of a biphasic fermentation broth, a fermentation broth product, fermentation product, or compositions that comprise a solid substance with yield enhancing *Methylobacterium* adhered thereto are also provided herein. In certain embodiments, the plant part is a seed. Partial coating of a plant or a plant part includes, but is not limited to coating at least about 5%, 10%, 20%, 30%, 40%, 50%, 60%, 70%, 80%, 90%, 95%, 98%, 99%, or about 99.5% of the surface area of the plant or plant part. In some embodiments, the plant part is a seed and partial coating includes, but is not limited to coating at least about 5%, 10%, 20%, 30%, 40%, 50%, 60%, 70%, 80%, 90%, 95%, 98%, 99%, or about 99.5% of the surface area of the seed. Also provided herein are processed plant products that comprise a solid substance with yield enhancing *Methylobacterium* adhered thereto.

In certain embodiments, seeds are treated by exposing the seeds to the fermentation broths, fermentation broth products, fermentation products, and compositions that comprise yield enhancing *Methylobacterium*. Seeds can be treated with the fermentation broths, fermentation broth products, and compositions provided herein by methods including, but not limited to, imbibition, coating, spraying, and the like. Seed treatments can be effected with both continuous and/or a batch seed treaters. In certain embodiments, the coated seeds can be prepared by slurrying seeds with a coating composition containing a fermentation broth or fermentation broth product comprising yield enhancing *Methylobacterium* and air drying the resulting product. Air drying can be accomplished at any temperature that is not deleterious to the seed or the *Methylobacterium*. In certain embodiments, air drying is accomplished at a temperature not greater than 30 degrees Centigrade. The proportion of coating that comprises yield enhancing *Methylobacterium* includes, but is not limited to, a range of 0.1 to 25% by weight of the seed, 0.5 to 5% by weight of the seed, and 0.5 to 2.5% by weight of seed. In certain embodiments, a solid substance used in the seed coating or treatment will have yield enhancing *Methylobacterium* adhered thereon. In certain embodiments, a solid substance used in the seed coating or treatment will be associated with yield enhancing *Methylobacterium* and will be present in a fermentation broth, fermentation broth product, or composition obtained by the methods provided herein. Various seed treatment compositions and methods for seed treatment disclosed in U.S. Pat. Nos. 5,106,648, 5,512,069, and 8,181,388 are incorporated herein by reference in their entireties and can be adapted for use with an active agent comprising the fermentation broths, fermentation broth products, or compositions provided herein. In certain embodiments, the composition used to treat the seed can contain agriculturally acceptable excipients that include, but are not limited to, woodflours, clays, activated carbon, diatomaceous earth, fine-grain inorganic solids, calcium carbonate and the like. Clays and inorganic solids that can be used with the fermentation broths, fermentation broth products, or compositions provided herein include, but are not limited to, calcium bentonite, kaolin, china clay, talc, perlite, mica, vermiculite, silicas, quartz powder, montmorillonite and mixtures thereof. Agriculturally acceptable adjuvants that promote sticking to the seed that can be used include, but are not limited to, polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof. Other useful agriculturally acceptable adjuvants that can promote coating include, but are not limited to, polymers and copolymers of vinyl acetate, polyvinylpyrrolidone-vinyl acetate copolymer and water-soluble waxes. Various surfactants, dispersants, anticaking-agents, foam-control agents, and dyes disclosed herein and in U.S. Pat. No. 8,181,388 can be adapted for use with an active agent comprising the fermentation broths, fermentation broth products, or compositions provided herein.

Provided herein are compositions that comprise yield enhancing *Methylobacterium* that provide for increased yield of soybean plants relative to untreated plants, plant parts, and plants obtained therefrom that have not been exposed to the compositions. In certain embodiments, plant parts, including, but not limited to, a seed, a leaf, a flower, a stem, a root, a pod, or a coleoptile can be treated with the compositions provided herein to increase soybean plant yield. Treatments or applications can include, but are not limited to, spraying, coating, partially coating, immersing, and/or imbibing the plant or plant parts with the compositions provided herein. Partial coating of a soybean plant or a soybean plant part includes, but is not limited to coating at least about 5%, 10%, 20%, 30%, 40%, 50%, 60%, 70%, 80%, 90%, 95%, 98%, 99%, or about 99.5% of the surface area of the soybean plant or soybean plant part. In some embodiments, the soybean plant part that is partially coated is a soybean plant seed. In certain embodiments, a seed, a leaf, a flower, a stem, a root, a pod, or a coleoptile can be immersed and/or imbibed with a liquid, semi-liquid, emulsion, or slurry of a composition provided herein. Such seed immersion or imbibition can be sufficient to provide for increased yield in a treated soybean plant or soybean plant grown from a treated seed in comparison to an untreated soybean plant or soybean plant grown from an untreated seed. In certain embodiments, plant seeds can be immersed and/or imbibed for at least 1, 2, 3, 4, 5, or 6 hours. Such immersion and/or imbibition can, in certain embodiments, be conducted at temperatures that are not deleterious to the plant seed or the *Methylobacterium*. In certain embodiments, the seeds can be treated at about 15 to about 30 degrees Centigrade or at about 20 to about 25 degrees Centigrade. In certain embodiments, seed imbibition and/or immersion can be performed with gentle agitation. In certain embodiments, the soybean seed or VE stage soybean plant is exposed to the composition by providing the composition in furrow. Providing the composition in furrow represents one of several methods provided herein for applying a composition to a soybean seed or to a soybean plant at about the VE stage of soybean plant development.

Compositions provided herein comprising yield enhancing *Methylobacterium* and related methods are therefore expected to be useful in improving yield in a wide variety of soybean plants, including, but not limited to, all varieties, subspecies, and cultivars of *Glycine max*.

In certain embodiments, an amount of a composition provided herein that is sufficient to provide for increased soybean yield can be a composition with yield enhancing *Methylobacterium* at a titer of at least about $1\times10^6$ colony-forming units per milliliter, at least about $5\times10^6$ colony-forming units per milliliter, at least about $1\times10^7$ colony-forming units per milliliter, at least about $5\times10^8$ colony-forming units per milliliter, at least about $1\times10^9$ colony-forming units per milliliter, at least about $1\times10^{10}$ colony-forming units per milliliter, or at least about $3\times10^{10}$ colony-forming units per milliliter. In certain embodiments, an amount of a composition provided herein that is sufficient to provide for increased soybean yield to a plant or plant part can be a composition with yield enhancing *Methylobacterium* at a titer of about least about $1\times10^6$ colony-forming units per milliliter, at least about $5\times10^6$ colony-forming units per milliliter, at least about $1\times10^7$ colony-forming units per milliliter, or at least about $5\times10^8$ colony-forming units per milliliter to at least about $6\times10^{10}$ colony-forming units per milliliter of a liquid or an emulsion. In certain embodiments, an amount of a composition provided herein that is sufficient to provide for increased soybean yield can be a fermentation broth product with a yield enhancing *Methylobacterium* titer of a solid phase of that product is at least about $1\times10^6$ colony-forming units per milliliter, at least about $5\times10^6$ colony-forming units per milliliter, at least about $1\times10^7$ colony-forming units per milliliter, or at least about $5\times10^8$ colony-forming units per gram to at least about $6\times10^{10}$ colony-forming units of *Methylobacterium* per gram of the solid phase. In certain embodiments, an amount of a composition provided herein that is sufficient to provide for increased soybean yield can be a composition with a *Methylobacterium* titer of at least about $1\times10^6$ colony-forming units per gram, at least about $5\times10^6$ colony-forming units per gram, at least about $1\times10^7$ colony-forming units per gram, or at least about $5\times10^8$ colony-forming units per gram to at least about $6\times10^{10}$ colony-forming units of *Methylobacterium* per gram of particles in the composition containing the particles that comprise a solid substance wherein a monoculture or co-culture of yield enhancing *Methylobacterium* is adhered thereto. In certain embodiments, an amount of a composition provided herein that is sufficient to provide for increased soybean yield to a plant or plant part can be a composition with a *Methylobacterium* titer of at least about $1\times10^6$ colony-forming units per mL, at least about $5\times10^6$ colony-forming units per mL, at least about $1\times10^7$ colony-forming units per mL, or at least about $5\times10^8$ colony-forming units per mL to at least about $6\times10^{10}$ colony-forming units of *Methylobacterium* per mL in a composition comprising an emulsion wherein a mono-culture or co-culture of a yield enhancing *Methylobacterium* adhered to a solid substance is provided therein or grown therein. In certain embodiments, an amount of a composition provided herein that is sufficient to provide for increased soybean yield to a plant or plant part can be a composition with a *Methylobacterium* titer of at least about $1\times10^6$ colony-forming units per mL, at least about $5\times10^6$ colony-forming units per mL, at least about $1\times10^7$ colony-forming units per mL, or at least about $5\times10^8$ colony-forming units per mL to at least about $6\times10^{10}$ colony-forming units of *Methylobacterium* per mL of in a composition comprising an emulsion wherein a mono-culture or co-culture of a yield enhancing *Methylobacterium* is provided therein or grown therein. In certain embodiments of any of the aforementioned compositions, the *Methylobacterium* is selected from the group consisting of (i) NLS0934 (NRRL B-67341), NLS0497 (ISO22), NLS0693 (ISO23), NLS1179 (ISO24), NLS1181 (ISO25), NLS0610 (ISO26), and variants thereof; and (ii) a combination of *Methylobacterium* isolate NLS0109 (NRRL B-67340) or a variant thereof, and *Methylobacterium* isolate NLS0017 (B-50931) or NLS0610, or variants thereof. In certain embodiments of any of the aforementioned compositions, the composition is a lyophilized composition.

In certain embodiments, an amount of a composition provided herein that is sufficient to provide for increased soybean yield can be a composition with a *Methylobacterium* at a titer of at least about $1\times10^4$ colony-forming units per milliliter, at least about $1\times10^5$ colony-forming units per milliliter, at least about $1\times10^6$ colony-forming units per milliliter, at least about $5\times10^6$ colony-forming units per milliliter, at least about $1\times10^7$ colony-forming units per milliliter, at least about $5\times10^8$ colony-forming units per milliliter, at least about $1\times10^9$ colony-forming units per milliliter, at least about $1\times10^{10}$ colony-forming units per milliliter, or at least about $3\times10^{10}$ colony-forming units per milliliter. In certain embodiments, an amount of a composition provided herein that is sufficient to provide for increased soybean yield can be a composition with *Methylobacterium* at a titer of at least about $1\times10^4$ colony-forming units per milliliter, at least about $1\times10^5$ colony-forming units per milliliter, about least about $1\times10^6$ colony-forming units per milliliter, at least about $5\times10^6$ colony-forming units per milliliter, at least about $1\times10^7$ colony-forming units per milliliter, or at least about $5\times10^8$ colony-forming units per milliliter to at least about $6\times10^{10}$ colony-forming units per milliliter of a liquid or an emulsion. In certain embodiments, an amount of a composition provided herein that is sufficient to provide for increased soybean yield can be a fermentation broth product with a *Methylobacterium* titer of a solid phase of that product is at least about $1\times10^4$ colony-forming units per gram, at least about 1×10$^5$ colony-forming units per gram, at least about 1×10$^6$ colony-forming units per gram, at least about 5×10$^6$ colony-forming units per gram, at least about 1×10$^7$ colony-forming units per gram, or at least about 5×10$^8$ colony-forming units per gram to at least about 6×10$^{10}$ colony-forming units of *Methylobacterium* per gram, at least about 1×10$^{11}$ colony-forming units of *Methylobacterium* per gram, at least about 1×10$^{12}$ colony-forming units of *Methylobacterium* per gram, at least about 1×10$^{13}$ colony-forming units of *Methylobacterium* per gram, or at least about 5×10$^{13}$ colony-forming units of *Methylobacterium* per gram of the solid phase. In certain embodiments, an amount of a composition provided herein that is sufficient to provide for increased soybean yield can be a composition with a *Methylobacterium* titer of at least about 1×10$^6$ colony-forming units per gram, at least about 5×10$^6$ colony-forming units per gram, at least about 1×10$^7$ colony-forming units per gram, or at least about 5×10$^8$ colony-forming units per gram to at least about 6×10$^{10}$ colony-forming units of *Methylobacterium* per gram, at least about 1×10$^{11}$ colony-forming units of *Methylobacterium* per gram, at least about 1×10$^{12}$ colony-forming units of *Methylobacterium* per gram, at least about 1×10$^{13}$ colony-forming units of *Methylobacterium* per gram, or at least about 5×10$^{13}$ colony-forming units of *Methylobacterium* per gram of particles in the composition containing the particles that comprise a solid substance wherein a mono-culture or co-culture of *Methylobacterium* is adhered thereto. In certain embodiments, an amount of a composition provided herein that is sufficient to provide for increased soybean yield can be a composition with a *Methylobacterium* titer of at least about 1×10$^6$ colony-forming units per mL, at least about 5×10$^6$ colony-forming units per mL, at least about 1×10$^7$ colony-forming units per mL, or at least about 5×10$^8$ colony-forming units per mL to at least about 6×10$^{10}$ colony-forming units of *Methylobacterium* per mL in a composition comprising an emulsion wherein a mono-culture or co-culture of a *Methylobacterium* adhered to a solid substance is provided therein or grown therein. In certain embodiments, an amount of a composition provided herein that is sufficient to provide for increased soybean yield can be a composition with a *Methylobacterium* titer of at least about 1×10$^6$ colony-forming units per mL, at least about 5×10$^6$ colony-forming units per mL, at least about 1×10$^7$ colony-forming units per mL, or at least about 5×10$^8$ colony-forming units per mL to at least about 6×10$^{10}$ colony-forming units of *Methylobacterium* per mL of in a composition comprising an emulsion wherein a mono-culture or co-culture of a *Methylobacterium* is provided therein or grown therein. In certain embodiments of any of the aforementioned compositions, the *Methylobacterium* is selected from the group consisting of (i) NLS0934 (NRRL B-67341), NLS0497 (ISO22), NLS0693 (ISO23), NLS1179 (ISO24), NLS1181 (ISO25), NLS0610 (ISO26), and variants thereof; and (ii) a combination of *Methylobacterium* isolate NLS0109 (NRRL B-67340) or a variant thereof, and *Methylobacterium* isolate NLS0017 (B-50931) or NLS0610 (ISO26), or variants thereof.

EXAMPLES

The following examples are included to demonstrate illustrative, non-limiting embodiments of the disclosure. It will be appreciated by those of skill in the art that the techniques disclosed in the following examples represent techniques discovered by the Applicants to function well in the practice of the invention. However, those of skill in the art should, in light of the instant disclosure, appreciate that many changes can be made in the specific embodiments that are disclosed, while still obtaining like or similar results, without departing from the scope of the disclosure.

Example 1

Preparation of *Methylobacterium*

In preparation for the field trials, *Methylobacterium* cultures were grown in ammonium mineral salts (AMS)+ peptone media containing a carbon source (AMS+carbon (15 g/liter)+peptone (10 g/liter)) at 30° C. for 4 days. To prepare one liter of liquid AMS medium+carbon+peptone ("AMS media solution"), the following components were added to a total volume of one (1) liter of distilled water: 700 milligrams of dibasic potassium phosphate anhydrous, 540 milligrams of monobasic potassium phosphate anhydrous, one gram of magnesium sulfate heptahydrate, 500 milligrams of ammonium chloride anhydrous, 200 milligrams of calcium chloride dihydrate, 15 g of a carbon source, and 10 g of peptone.

The AMS media solution was sterilized by autoclaving. After growing for 4 days at 30° C., cultures were harvested by centrifugation at 5000 rpm for 10 minutes and then re-suspended in AMS media solution with 20% (v/v) glycerol as a cryoprotectant. The cultures were aliquoted and frozen at −80° C. until thawed for use. The liquid *Methylobacterium* preparations were applied to commercial soybean seeds that had been treated with conventional fungicides and insecticides. The liquid *Methylobacterium* preparations were applied to the seeds at a rate of about 1×10$^5$ CFU/seed to about 1×10$^6$ CFU/seed.

Example 2

Increased Soybean Yield by Application of *Methylobacterium* Compositions in 2017 Yield Trials Soybean microplot field trials were established at four locations throughout the Midwest soybean growing region for the purpose of evaluating 67 *Methylobacterium* isolates applied as a seed treatment to commercial soybean seeds. Six controls that were not treated with a *Methylobacterium* isolate were included in the trials.

The microplot trials were conducted as randomized complete block design. There were six replications of each of the *Methylobacterium* isolates and controls at each location. The trials were established within existing farmer field sites and managed with local agronomic practices. All soybean varieties used were glyphosate-tolerant varieties. The trials were harvested for yield at physiological maturity with a commercial harvest combine.

Results

The analysis of yield results was conducted with JMP14 (SAS Institute), and the assumptions of normality and equal variance were tested prior to executing the Analysis of variance (ANOVA). ANOVA was conducted with the Analyze-Fit Model routine. Comparisons of *Methylobacterium* isolates to the average of the six untreated controls were performed with two-tailed t-tests applied to the pairwise differences between least-squares means estimated from the ANOVA model, under the null hypothesis that the difference in means was zero.

Across-locations analyses for the four locations were conducted according to the following model: [2] $Y_{hijk}$=M+ $I_i$+$S_j$+$IS_{ij}$+$L_h$+$R(L)_{k(h)}$+$LI_{hi}$+$IR(L)_{ik(h)}$+$LS_{hj}$+$LIS_{hij}$+$e_{hijk}$, where $Y_{hijk}$ is the yield at location h of isolate i at stage j in replicate k, M represents the overall mean, $I_i$ is the fixed effect of isolate i, $S_j$ is the fixed effect of stage j, $IS_{ij}$ is the fixed effect of the interaction of isolate i and stage j, $L_h$ is the random effect of location h, $R(L)_{k(h)}$ is the random effect of replicate k nested within location h, $LI_{hi}$ is the random effect of the interaction of location h and isolate i, $IR(L)_{ik(h)}$ is the random effect of the interaction of isolate i and replicate k nested within location h, $LS_{hj}$ is the random effect of the interaction of location h and stage j, $LIS_{hij}$ is the random effect of the three-way interaction of location h with isolate i and stage j, and $e_{hijk}$ is the random error.

Yield results for isolates selected for further analysis are shown in Table 2 below.

TABLE 2

Yield results from 2017 soybean yield trials

| Treatment | Mean yield (Bu/A) | Yield difference from UTC (Bu/A) | Yield difference from UTC (%) | Contrast p-value v. UTC | Win rate (# locations above UTC) |
|---|---|---|---|---|---|
| NLS0934 | 92.9 | +6.0 | +6.9% | 0.0086 | 4/4 (100%) |
| NLS1181 | 92.0 | +5.1 | +5.9% | 0.025 | 4/4 (100%) |
| NLS1179 | 91.6 | +4.7 | +5.4% | 0.039 | 4/4 (100%) |
| Methylobacterium S4 | 91.2 | +4.3 | +4.9% | 0.055 | 4/4 (100%) |
| Methylobacterium S3 | 91.1 | +4.2 | +4.8% | 0.062 | 4/4 (100%) |
| NLS0693 | 91.0 | +4.1 | +4.7% | 0.075 | 3/4 (75%) |
| NLS0610 | 90.0 | +3.1 | +3.6% | 0.17 | 4/4 (100%) |
| UTC | 86.9 | — | — | — | — |
| Methylobacterium S5 | 85.7 | −1.2 | −1.4% | 0.59 | 2/4 (50%) |
| NLS0497 | 85.7 | −1.2 | −1.4% | 0.59 | 1/4 (25%) |
| Methylobacterium S2 | 85.7 | −1.2 | −1.4% | 0.59 | 2/4 (50%) |
| Methylobacterium S1 | 82.4 | −4.5 | −4.5% | 0.041 | 1/4 (25%) |

*P-values taken from a two-tailed t-test comparing each treatment to the Untreated Check (UTC).

Example 3

Increased Soybean Yield by Application of *Methylobacterium* Compositions in 2018 Yield Trials Strains for use in 2018 field trials were selected based on results from the 2017 field trials described above and cultures were prepared for inoculation as described in Example 1. Isolates demonstrating positive yield results in 2017 and several isolates that demonstrated a negative effect on yield were selected. Soybean field trials were established at four locations throughout the Midwest soybean growing region for the purpose of evaluating the *Methylobacterium* isolates applied as a seed treatment to commercial soybean seeds. Controls that were not treated with a *Methylobacterium* isolate were included in the trials.

The trials were conducted as randomized complete block design consisting of four 30-inch rows that were 40 feet long. There were four replications of each of the *Methylobacterium* isolates and controls at each location. The trials were established within existing farmer field sites and managed with local agronomic practices. Harvest was done per standard grower practices and plot yields were determined using conventional metered combine harvesters. Plot test weights were used to calculate bu/acre yield estimates for each plot.

Results

The analysis of yield results was conducted as described above. Data for isolates showing an increase in soybean yield are provided in Table 3 below.

TABLE 3

Yield results from 2018 soybean yield trials.

| Treatment | Mean yield (Bu/A) | Yield difference from UTC (Bu/A) | Yield difference from UTC (%) | Contrast p-value v. UTC | Win rate (# locations above UTC) |
|---|---|---|---|---|---|
| NLS0934 | 73.8 | +3.0 | +4.2% | 0.0050 | 4/4 (100%) |
| NLS1181 | 73.5 | +2.7 | +3.8% | 0.0098 | 4/4 (100%) |
| NLS0497 | 73.2 | +2.4 | +3.4% | 0.025 | 3/4 (75%) |
| NLS0693 | 72.6 | +1.8 | +2.5% | 0.097 | 3/4 (75%) |
| NLS1179 | 72.5 | +1.7 | +2.4% | 0.10 | 2/4 (50%) |
| NLS0610 | 70.9 | +0.1 | +0.1% | 0.94 | 2/4 (50%) |
| UTC | 70.8 | — | — | — | — |
| Methylobacterium S1 | 70.8 | 0 | 0 | 1.00 | 2/4 (50%) |
| Methylobacterium S2 | 70.7 | −0.1 | −0.1% | 0.92 | 2/4 (50%) |
| Methylobacterium S3 | 70.7 | −0.1 | −0.1% | 0.86 | 2/4 (50%) |
| Methylobacterium S4 | 70.1 | −0.7 | −1.0% | 0.47 | 2/4 (50%) |
| Methylobacterium S5 | 70.0 | −0.8 | −1.1% | 0.39 | 2/4 (50%) |

*P-values taken from a two-tailed t-test comparing each treatment to the Untreated Check (UTC).

Example 4

Increased Soybean Yield by Application of Dry *Methylobacterium* Compositions

In preparation for the field trials, *Methylobacterium* cultures were grown in ammonium mineral salts (AMS)+peptone media containing a carbon source (AMS+carbon (15 g/liter)+peptone (10 g/liter)) at 30° C. for 4 days. To prepare one liter of liquid AMS medium+carbon+peptone ("AMS media solution"), the following components were added to a total volume of one (1) liter of distilled water: 700 milligrams of dibasic potassium phosphate anhydrous, 540 milligrams of monobasic potassium phosphate anhydrous, one gram of magnesium sulfate heptahydrate, 500 milligrams of ammonium chloride anhydrous, 200 milligrams of calcium chloride dihydrate, 15 g of a carbon source, and 10 g of peptone.

The AMS media solution was sterilized by autoclaving. After growing for 4 days at 30° C., cultures were harvested by centrifugation at 5000 rpm for 10 minutes and cell pellets from centrifugation were re-suspended in AMS media solution at one tenth the original volume ("concentrated slurry").

The concentrated slurry and commercial formulation additives were mixed and the resulting mixture was frozen at −80° C. Frozen mixture was freeze-dried using standard industrial freeze-drying conditions and then ground into a powder. The powder was applied to commercial soybean seeds that had been treated with conventional fungicides and insecticides at a rate of about $1 \times 10^5$ CFU/seed to about $1 \times 10^6$ CFU/seed.

Soybean field trials were established at multiple locations throughout the Midwest soybean growing region (9 locations in 2017 and 11 locations in 2018). The trials were conducted as randomized complete block design consisting of four 30-inch rows that were 40 feet long. There were four replications of each of the *Methylobacterium* isolates and controls at each location. *Methylobacterium* S6 positive control contained a *Methylobacterium* isolate that was previously shown to increase soybean yield (US20160302423). The trials were established within existing farmer field sites and managed with local agronomic practices. Harvest was done per standard grower practices and plot yields were determined using conventional metered combine harvesters. Plot test weights were used to calculate bu/acre yield estimates for each plot. Results are reported in Table 4 below.

TABLE 4

| Treatment | 2018 Yield bu/ac | 2017 Yield bu/ac | 2017/18 average yield | 2 yr average increase vs UTC (bu) |
|---|---|---|---|---|
| Methylobacterium S6 Control | 62.56 | 58.10 | 60.33 | 4.47 |
| NLS0610/N130109 | 61.77 | 58.51 | 60.14 | 4.28 |
| NLS0017/N130109 | 61.24 | 60.02 | 60.63 | 4.77 |
| NLS0610 | 62.09 | 58.52 | 60.31 | 4.45 |
| Optimize ® | 60.08 | | | |
| UTC | 57.47 | 54.24 | 55.86 | |

Example 5 Detection and Identification of Methylobacterium Strains, Variants and Derivatives Assays are disclosed for detection or identification of specific Methylobacterium strains and closely related derivatives. Genomic DNA fragments unique to a Methylobacterium strain are identified and qPCR Locked Nucleic Acid (LNA) based assays are developed.

Genomic DNA sequences of Methylobacterium strains are compared by BLAST analysis of approximately 300 bp fragments using a sliding window of from 1-25 nucleotides to whole genome sequences of over 1000 public and proprietary Methylobacterium isolates. Genomic DNA fragments are identified that have weak BLAST alignments, indicative of approximately 60-95% identity over the entire fragment, to corresponding fragments of a Methylobacterium of interest. Fragments from the target Methylobacterium strain genome corresponding to the identified weak alignment regions were selected for assay development.

Target fragment sequences that distinguish NLS0497 (ISO22), NLS0693 (ISO23), NLS1179 (ISO24), NLS1181 (ISO25), and NLS0610 (ISO26), from related Methylobacterium isolates are provided in Table 5 below.

TABLE 5

Unique Fragment Sequences of Methylobacterium Strains

| Strain | Fragment | SEQ ID NO | Sequence |
|---|---|---|---|
| NLS0497 | ref1_46464 | 1 | CTCAACGTTGCCGCCTTAACCGAAGACTAACTA ACATAAATTTCAGTTAGCCGCGAAACAGAATAT GATACTTGGTCTTATACGACGCATAGAGGCGCA TTCCGTCAAGTCGCGCATTGCAGAGTCCCCCGA AAATTCGTTTTCTGGGAGCGAGCAGAAACGTGT GCACGTGTTCTGTCACTCTATTTTCTGGTTTAGA GCAATCATCTCGCGGCTCAGATCCCGTCGTTCCA TAGAGTGGTTTCCGGTTCAGTATGAATTGTGAGC AGCCCCTGCGGCTATATCTACTTCGACGTATA |
| NLS0497 | ref1_85227 | 2 | ACCAACAGGCAGAAGAGGCTTACAAAAATGCTC TAGATATCTATAATCGCGCCGGTCTGGATAATA GGCGGGAAAAGTCAAATATTCTTATCGGACTTG GCGATGCAGCTAGCGCACTGAGCAAATTTATAG ACGCGAAAAATTTCTACAGTGAAGGTTTAGCAG TCCGAGCGCGGTCATGACGGTGCTTGCGGACTA GTGTCTGCTCGCAATTCAGAGCAGCCGCTTCGGC TGGTTCAGTTTGGGTATGCCCTTTCTGTACCAGC CTGTGACTGGTCTGGTATGTAGCCCTTGACCAAT |
| NLS0497 | ref1_98103 | 3 | ATGAAGCTCCGTCGTGTTTATGTAAAGAACGTTC GCAGTTTCTACGATGCTGAAGAACTCATTCTGGA CGGAGATATTTCTATTATTATAGGCCCAAATGGT GGAGGAAAAACAAATCTACTTGATGCGACGATA CACTTGTTGAGAAGACATTTATTGCAATCGTGGG CTGTCGTTCGCCATACATACACGCCAATAAACTA TTCCGATCACTTCCAACCAAATGATCAAATCACA AACTATGCGCTGGAGAAGTACAGCGGTCGCGAA AGCGAAGACCAAGTCGTTGAGTTCGATATC |
| NLS0693 | ref1_622066 | 4 | CGGGGGCGGTCTCCTCATATATGGAGGGAATTA ATCTGAAGGGTCGGAGCCCCCGCTACGGCACAC ACACGGCGGCGGGCGGTGGGCTCCTTCCTCATA TACGCTTCCTGATAATTTCGACCGTAATCGCCCG CCGGCCGAGCGGCCAGACCTTATTAGTCCAGCA TCACACGGTGCATCGTATCGTGGAGGGCGAACA ACCGCCTAAGGTTCGCCACGTAGCCATCCACAT CCGCCCTTGCCGCTCGCGCAAGGGAAGCAGAAT GCTTGATAGCGACTTCGCGGGCGTCTTTGGTAGC C |
| NLS0693 | ref1_2496 | 5 | TGTGGGCGCTCATGGAAACGGGGGACGTGCTTT TTTGATCTCTAGCCATTGTCATCATCCATCGGTC CGGGTGACAGGCCTTTACGCACATAACAACGGT TATTTCGATCAGCCCCCTCCTGATCGCACAAGTC AGCTATACAGATGCTTCTGAAAGCCAACAAAGG CGTTACGTATCTGCGTGACCCCACCGAGCTGCGC |

TABLE 5-continued

Unique Fragment Sequences of Methylobacterium Strains

| Strain | Fragment | SEQ ID NO | Sequence |
|---|---|---|---|
| | | | TGCGGCATCGCTGACAGCTCTGTATTTTAATTCG AGGAGGTGGGGCAATTTAGCCTGGTCAAGCTCG CCAACGTCTTCCTTCACATATTGAGACAGGAC |
| NLS0693 | ref1_2640477 | 6 | AGAGTGTATTTCCCCAAGACTTTATCTCTTTGCT CATCACAAAACAGCCCGCTCAAGATGATATGCG CTGGGATTTGTGCCGCGACCCGTTGTAATTGTAT TTACCTCTCGGCTCATGTTCCCTGTCGCCGGAGC GATTGGAGGTAAAGTAATCTCAACTTTGCGGCC CATGGCTGATGCTAGCTCAGCTACGCGACCTAA GGTAATATCTTTGTGTCCGCGGAGTTCGCGATGA ATGACCGAGCGATTGACGCCGATGGTGCGGGCA ATATCGGCTTGAGTTAGACCGTTCTTGGCTTC |
| NLS1179 | ref1_687571 | 7 | ACCTGTCTCGACATCGGGGCAGCCACGAGGCG TCGGCCGTGGTAGATCTCGGCGAAGCGGTAGTA GTGGGCGAGGTCCCCATCGGGATCGATGGGGGA GTCCGGCGTACCTTCTCCCTCTTCTGCGATTAGC GACAGGGCTCGCATGGCGCTGGGTGCGTCAGTG ATGGCGAACAACCTACTATCGGGGAACCACCGC CTGTCGACGAGCTGGCGGTCCGGGTTTCCTTTGA AGACAGCGTCACCCAGCGCTTCGATCTTCTCAAT CAAGGCTGCGTAGAACTGCCCGATGGTCGCGAA |
| NLS1179 | ref1_695522 | 8 | GACGTGGTGACGGTGGCACCAGTCGCCCAGCGA AGCGGCTACTGTACTGAGCCCGCAGTCATGTCG GCTGAAGAAATGGTCGATATGCCCCAGGGAGGT CGGGCGTAGGTCGTACCTCAAATTCACCGGCAG GATCTTGTCCAGCAAGGCGTCCGAATTCGCATC GACCTGACTTAGGAAATTACCGAGGTAATCGCT CGGTCCGTTCGCGTCGGCGGCCTGCATCGCCAG CAGCGCCTTATGCTCGGTCGTCAACTCACGAGC GAATATTGTCCAGGACAGGTTGTCGACCTCGGC GAC |
| NLS1179 | ref1_705877 | 9 | GAGCATGGCAGGCCACCACGCATCGCTTCTTCA TCACCTTGCTCGGACGACTTGCTGCTTTGTCGGT CTCTCTCTCAAGGACGAGACGCTGCGACACTTG CTTCGTCAGAGTGCCAGGATTAATCCCGGTCAAT ACCACTACTACGTCAGCTGGCGTGCGCCGGGCG GCACGAGGGACGTCGACGCGGAACGATTGATTC GAGACGCTAACTTTGACGTGTACAATTTAGTCAC GCTTTTCCTTAGCGACGCCGAGATAGCCTCGTTG GGCCGCTTGCTCACCGCCGATGCAGCCGAGTT |
| NLS1181 | ref1_54084 | 10 | AACGCGATGGGAGCAGCACGTAATGGGCGTCAT ACAAGATATAAAAGAAGGACTTGAAGGTAGAAT AGATAACCTTAAGGAAAATATTGATAATATCAG TTCCAGTATCACATGCACAATACAAGGAGTGCC GAAGGTCGAGTCAGAAAGAATTTTGGGATGTGC AAACGCTTCGTTTGACCAAATACAGAAAATGTG GATGAATGGTCCTACGGATAGGGCTGCATTTCTC GACGCCGTGAAAAGTTTGATAGACCGCAACGCA AGTAATGGAAAATTCGGAGTTCCAGGATCATAT TG |
| NLS1181 | ref1_4816166 | 11 | TTTTCCTTTCGCGCCTATGACCTGAGTGCGGCCG AAGCTGTCCGCTTATTAGAGTTTTACAACCAGAT GCGAGCGGCTTAGCTCTTCCTCCGTTATTAAGCA GGGCGCCTCTTCTTAGGGGCGCCCCTTCATATTT AATCTTGTCTGATGTCTGGCGCCATATCAGACAA ACATCAGCGTTGACCTTGATTTTGCATCTACATT AGGGTTGCTCCCAGAATGGAGCCGCCGATGTCC GTCCCGTACCTCAAGCGAGAGATGTGGGGTGTG TATTACATCCATTGGCGCGAGGGCGGCCGC |
| NLS1181 | ref1_2292077 | 12 | GTTGGAGATGGTGCCGTTTGCAACCGTCAGATC GCCTACTGTGAATCCGGTGACCTCCCGAGAGAA CGTGAAGGTAACTGTCGTAGTCTCGCCAACTGC CAAAGAGGTGTCCGCAACGGCGATGGTCGCTGT CGGGGCGCTTGTTTGGACATCAACGGTGAGACC CGCCGAGGCAGGCCCCGTGTTACCAGCGGTATC GACGGCCCTAGCGGTGACCGTGTGCGATCCAGC CGTTAGCGTCGAACTGGTGATGCTATAGGTCCC |

TABLE 5-continued

Unique Fragment Sequences of Methylobacterium Strains

| Strain | Fragment | SEQ ID NO | Sequence |
|---|---|---|---|
| | | | GCCGATCGCCACTGCCGAGCCCAGAATGGTCGT GCC |
| NLS0610 | ref1_2810264 | 13 | ACCGAAGGCGTCCCCGGACACGAAGGCCTGAAACAC CATATCTGTGGCGATCAGGCCGACGTGGTCGCGGAC TTCAACTGGCAGAGAATGCCAGGCCGCTTCGATTTCA GATGATACTGGTACGGACATAGGAGCGGCTTAGCTT TCTCAGTGCAAATGTGATTGATTCCGGCTCAAAAATG ATCTTGATCGGACGAGACGTTTTCAATCCATGTCGTG TTGCCATCGCCGATCGGTGCGTCAAGAGACAGATGG CGCCGACCGTAGATACGCGTTCGGGTTGCCCGCACC GCTTCTCCA |
| NLS0610 | ref1_322980 | 14 | GGAGGTGTGATCTGATGATGTGCTGGATGAAAT TGGCGGTCGAGCACTTGTTCAGCTTGGCCAGCTC GACGAGATCGGCGTGATGCTCGGCGTCGATCAG GATGTTCAGCGAGACCGGACGTACGCAGGACTT GGTATTAGCGCCGTTGCGCATCAGCTTGCAGCCT TGCTCTGCTTCTCAGCGTGCCGCGTCAGGATGAC CCTGATGTAGCTGTTGAGGTTGATGCCGTAATAG CCTGCGGACTCTGTGAGATCCCGGCGAAGATCG TCGGCGAGGGTCAGGCGGATGGTGCTGGTCGG |
| NLS0610 | ref1_2785241 | 15 | AAGTAACCGCTCAACATGATCTTCAGCATGTTGT CCAACAGCAGGAGAATACATGTAATTCACCATG ACCGGCAAGCTGCGACTGGCCATTGCTTCCACC GCTTGAATGTAGCGATCGAATTTCGCAAAATCA GGGTGGAATGAAAATATCGAACCAAACTGCGAG CCTTGAATCCGTTCTGCAAAATTATCGAAAAATT TTCTTGGCCGACTGCCGTTCGAAAACATTCTTAC GTTTACATGCGGCCCGCCTGAAACAAGACAGTC TACCAGCTCTGGGAAATGGGGGTGAAGGGTCGG |

Regions in SEQ ID NOS: 1-15 where corresponding regions in other *Methylobacterium* strains were identified as having one or more nucleotide mismatches from the target *Methylobacterium* strain sequence were selected, and qPCR primers designed using Primer3 software (Untergasser et al. (2012), Koressaar et al. (2007)) to flank the mismatch regions, have a melting temperature (Tm) in the range of 55-60 degrees, and to generate a PCR DNA fragment of approximately 100 bp. The probe sequence was designed with a 5' FAM reporter dye, a 3' Iowa Black FQ quencher, and contains one to six LNA bases (Integrated DNA Technologies, Coralville, Iowa). At least 1 of the LNA bases is in the position of a mismatch, while the other LNA bases are used to raise the Tm. The Tm of the probe sequence is targeted to be 10 degrees above the Tm of the primers.

Primer and probe sequences for specific detection of NLS0497 (ISO22), NLS0693 (ISO23), NLS1179 (ISO24), NLS1181 (ISO25), NLS0610 (ISO26), and variants thereof, are provided as SEQ ID NOS: 16-51 in Table 6. Each of the probes contains a 5' FAM reporter dye and a 3' Iowa Black FQ quencher.

TABLE 6

Primers and Probes for Specific Detection of Strains

| Primer/Probe | SEQ ID NO | Sequence* |
|---|---|---|
| NLS0497_ref011_46464_For | 16 | CACGTGTTCTGTCACTCTATT |
| NLS0497_ref011_46464_Rev | 17 | GAACCGGAAACCACTCTATG |
| NLS0497_ref011_46464_Probe | 18 | AGCAATCATCTCGCGGCTC |
| NLS0497_ref022_85227_For | 19 | GCGCACTGAGCAAATTTATAG |
| NLS0497_ref022_85227_Rev | 20 | CTGAATTGCGAGCAGACA |
| NLS0497_ref022_85227_Probe | 21 | AGTGAAGGTTTAGCAGTCCG |
| NLS0497_ref015_98103_For | 22 | CTACTTGATGCGACGATACAC |
| NLS0497_ref015_98103_Rev | 23 | GGTTGGAAGTGATCGGAATAG |
| NLS0497_ref015_98103_Probe | 24 | TCGTTCGCCATACATACACG |
| NLS0693_ref1_622066_For | 25 | GCTCCTTCCTCATATACGCTTC |

TABLE 6-continued

Primers and Probes for Specific Detection of Strains

| Primer/Probe | SEQ ID NO | Sequence* |
|---|---|---|
| NLS0693_ref1_622066_Rev | 26 | CCGTGTGATGCTGGACTAATAA |
| NLS0693_ref1_622066_Probe | 27 | TAATTTCGACCGTAATCGCC |
| NLS0693_ref6_2496_For | 28 | TGATCGCACAAGTCAGCTATAC |
| NLS0693_ref6_2496_Rev | 29 | CGAGCTTGACCAGGCTAAAT |
| NLS0693_ref6_2496_Probe | 30 | ACGCCTTTGTTGGCTTTCAG |
| NLS0693_ref1_2640477_For | 31 | CGGAGCGATTGGAGGTAAAG |
| NLS0693_ref1_2640477_Rev | 32 | CTCCGCGGACACAAAGATATTA |
| NLS0693_ref1_2640477_Probe | 33 | AATCTCAACTTTGCGGCCC |
| NLS1179_ref1_687571_For | 34 | CTTCTCCCTCTTCTGCGATTAG |
| NLS1179_ref1_687571_Rev | 35 | GACGCTGTCTTCAAAGGAAAC |
| NLS1179_ref1_687571_Probe | 36 | TGATGGCGACAACCTACT |
| NLS1179_ref1_695522_For | 37 | GCATCGACCTGACTTAGGAAA |
| NLS1179_ref1_695522_Rev | 38 | GAGTTGACGACCGAGCATAA |
| NLS1179_ref1_695522_Probe | 39 | AGGTAATCGCTCGGTCCGT |
| NLS1179_ref1_705877_For | 40 | CTTTGTCGGTCTCTCTCTCAAG |
| NLS1179_ref1_705877_Rev | 41 | CAGCTGACGTAGTAGTGGTATTG |
| NLS1179_ref1_705877_Probe | 42 | TCGTCAGAGTGCCAGGATT |
| NLS1181_ref1_54084_For | 43 | GTTCCAGTATCACATGCACAATAC |
| NLS1181_ref1_54084_Rev | 44 | CGTAGGACCATTCATCCACAT |
| NLS1181_ref1_54084_Probe | 45 | TTTGGGATGTGCAAACGCT |
| NLS1181_ref1_4816166_For | 46 | GCTTAGCTCTTCCTCCGTTATT |
| NLS1181_ref1_4816166_Rev | 47 | ATTCTGGGAGCAACCCTAATG |
| NLS1181_ref1_4816166_Probe | 48 | ATCTTGTCTGATGTCTGGCG |
| NLS1181_ref1_2292077_For | 49 | CGTGAAGGTAACTGTCGTAGTC |
| NLS1181_ref1_2292077_Rev | 50 | CACCGTTGATGTCCAAACAAG |
| NLS1181_ref1_2292077_Probe | 51 | AACTGCCAAAGAGGTGTCC |
| NLS0610_ref1_2810264_For | 52 | CATAGGAGCGGCTTAGCTTTCT |
| NLS0610_ref1_2810264_Rev | 53 | GATGGCAACACGACATGGATTG |
| NLS0610_ref1_2810264_Probe | 54 | CAGTGCAATGTGATTGATTC |
| NLS0610_ref1_322980_For | 55 | GACGTACGCAGGACTTGGTATTAG |
| NLS0610_ref1_322980_Rev | 56 | CTCAACAGCTACATCAGGGTCATC |
| NLS0610_ref1_322980_Probe | 57 | TTGCTCTGCTTCTCAGCGTG |
| NLS0610_ref1_2785241_For | 58 | AACCAAACTGCGAGCCTTGA |
| NLS0610_ref1_2785241_Rev | 59 | GGGCCGCATGTAAACGTAAGA |
| NLS0610_ref1_2785241_Probe | 60 | TTCTTGGCCGACTGCCG |

*Bold and underlined letters represent the position of an LNA base

Use of Primer/Probe Sets on Isolated DNA to Detect Specific *Methylobacterium* Isolates and Variants Thereof and Distinguish from Related *Methylobacterium* Isolates Each 10 ul qPCR reaction contains 5 ul of Quantabio PerfeCTa qPCR ToughMix 2× Mastermix, Low ROX from VWR, 0.05 ul of 100 uM forward primer, 0.05 ul of 100 uM reverse primer, 0.05 ul of 50 uM probe, 2.85 ul nuclease free water and 2 ul of DNA template. Approximately 1 ng of DNA template is used per reaction. The reaction is conducted in a ThermoFisher QuantStudio™ 6 Flex Real-Time PCR System with the following program: 95° C. for 3 min, then 40 cycles of 95° C. for 15 sec and 60° C. for 45 seconds. The analysis software on the PCR instrument calculates a threshold and Ct value for each sample. Each sample is run in triplicate on the same qPCR plate. A positive result is indicated where the delta Ct between positive and negative controls is at least 5.

Other *Methylobacterium* isolates listed in Table 1 and variants thereof are identified by the presence of DNA fragments using assays as described above. Unique fragments for use in such methods are provided in Table 7.

TABLE 7

| Strain | Fragment | SEQ ID NO | Sequence |
|---|---|---|---|
| NLS0017 | ref4_930 | 61 | GCAAAACGACCTAATAGTTCTACAGCGGCATGCG CCAAGTCAGCGCGGTGAACAGTATACCTGGGAG CAACTTGTCCTCCGAAACCCACATAAAACAAATT ACTCCTGGCAGTGCCCAGTCCATCAAAATCGAAT ACAATATTTCTCGAGGAGGCATCTGTAATAGCCT GCCAAAGCAACAAAGCTATGGCGCCGTTATGACT TTCATTGCTTCTGGTAGACATAAAATAATATGCC GATTTGTGATCCCAAATGTAGAATATTGCCGCAT CAATTGCGCCAAGTTTATTTCGGATCGAT |
| NLS0017 | ref1_142021 | 62 | GGCGCCAACGGTATGATCGCATGATTTTCCTGCG GCATAGCTTGCGGGAATGGCGTATTTGGCGCTCT CCTCAGGAATTTCTAAGGGCATACGCAGGAACTC TACAGCACTTTTACTGGTATTTTGTAGTGACAGC GGAGGAGGCTGGTGCTCAAGGTAATCGTGATGA AGTGATCCGGGCCATTCGGGGCGCGTTTCTAGTC TTTCCAATCCGCGCCCTGTACCACGTATTACGCC GGACCGGTCTGCGCCGCGCCGCCCTCTTGACCGC CCTAAATGTCTAAGAGCGTCTAACAAAGC |
| NLS0017 | ref1_142636 | 63 | GACGATATCGCTCATCTTCACTGCATTGAAGCTG GTGCCGTACTGCATAGGGATGAAAAAGTGATGC GGATAGACGGCTGACGGGAAAGCGCCTGGTCGA TCGAAGACTTTGCTGACGAGGTTGTGGTAGCCCC GGATATAGGCATCGAAGGCCGGGACGTTGATCCC ATCCTTTGCCTTATCTTGACTGGCGTCGTCGCGTG CCGTCAGAACGGGCACGTCGCAGGTCATCGAGG CCAGCACCTTGCGGAACACCTGCGTTCCGCCGTT GGGATTATCGACGGCGAACGCGGTGGCCGC |
| NLS0020 | ref3_25009 | 64 | GCCCTTCTGTCAGGCGATATTGTATAATGGCGTT GCCCCAATAGAAGCAGCCATTCGTGCGAGGGCA GCAGCGACGCTAGGTCGAAAGAGCATCCTAATCT CGATCAAGATGCGACTGAGATTTCTGATGAAAAT ATCTAGACACAAGCAAAGCTGGTGAAATTACAA CGATCATGGCGACAATTGCGGCCAATTCGGCCGG AACTTGAAGGAACATAAAAATGAATATTACAAA TATACCGCAAAGCATGTAGAGTTGCTACACCAAG GGTCGGGACGTCCAAAAAAACTCACTGAGGA |
| NLS0020 | ref3_25219 | 65 | GGAACATAAAAATGAATATTACAAATATACCGC AAAGCATGTAGAGTTGCTACACCAAGGGTCGGG ACGTCCAAAAAAACTCACTGAGGAAGTCGACTG GAAGCACGAGGCGCCCCCCCAGGAGCGGGGCG ACCGGCAAGGGGGCCCGCAATTGTCGCCATGATC GACCAGCTTAGGTAGGATCCTCTTTCGACCTAAC GAATGGCTGCTTCTATTGGGGCAACGCCATTATA CAATATCGCCTGACCATCTGGAACGCGGCCCGGT CCACCGGCAGGTTGGCGACGACAGCGTCGGAG |
| NLS0020 | ref1_4361220 | 66 | CGGCGTCGACCAGCCGGGCGAACTGCTTGGGCAT GCTCTCCCGCGACGCCGGCCACAGCCGCGTCCCC GTCCCTCCGCACAGGATCATCGGGTGGATTTGAA AGGCAAAACGGGACATCAGGATAGGCCGCTCAG GCGTTGGCGCTGAGGCGCTTGATGTCGGCGTCGA CCATCTCGGTGATCAGCGCCTCGAGGCTGGTCTC GGCCTCCCAGCCGAAGGTCGCCTTGGCCTTGGCG GGGTTGCCCAGCAGCACCTCGACCTCTGCCGGCC GGAACAGCGCCGGGTCGACGATCAGGTGG |
| NLS0020 | ref1_4602420 | 67 | CTGGACATGCGCCCACCCCGGCCAAGTCCGACCG CACCGGCAACCGCTCCTGTAGTCGTCGTCATCGT TCTCACCCCTGAGGCGGAGACCGTCCGCTAACGG |

TABLE 7-continued

| Strain | Fragment | SEQ ID NO | Sequence |
|---|---|---|---|
| | | | GGTGTCTCAAGCAACCGTGGGGCGGAGGAACAC GCACGTAGTCGCGTTTCAAGGTTCGCACGAACGC CTCGGCCATGCCGTTGCTCTGCGGGCTCTCCAGC GGCGTCGTTTTGGCACCAAACCAAGGTCGCGGG CGAAGCGGCGCGTGTCGCGGGGACTGTCAGGAA TTTCGTGTGGGGGCGGCCATAGTGGATCCG |
| NLS0089 | ref1_194299 | 68 | GGAAATCGGCTTCAAGTACGACGTCACGCCGGCC ATGCAGGTCACGGGTGCACTGTTCAATCTCGAGC GCGACAACCAGCCGTTCCCCTCGAACGTGGAGTC CGGCCTCGTCCTTGGCGCAGGTCAGACACGCACC CAGGGCGCGGAAATCGGCCTGGCCGGCTATCTAA CCGATTGGTGGCAGGTCTTTGGCGGCTACGCTTA TACCGAGGCACGCGTACTCTCGCCACTGGAAGAC GATGGAGACGTGATCGCAGCAGGTAATCTCGTCG GCAACGTTCCGCTAAATACTTTCAGTCT |
| NLS0089 | ref1_194305 | 69 | CGGCCTGGCCGGCTATCTAACCGATTGGTGGCAG GTCTTTGGCGGCTACGCTTATACCGAGGCACGCG TACTCTCGCCACTGGAAGACGATGGAGACGTGAT CGCAGCAGGTAATCTCGTCGGCAACGTTCCGCTA AATACTTTCAGTCTGTTCAACAAGTTCGATATCA ACGAGAATTTCTCCGTTGCTCTGGGCTATTACTAT CAGGATGCCAGCTTTGCCTCCTCAGACAATGCAG TGCGTTTGCCAAGTTATTCGCGGTTCGATGGCGG GTTGTTCTATCGATTCGACGAGTTGAC |
| NLS0089 | ref1_194310 | 70 | ACGTTCCGCTAAATACTTTCAGTCTGTTCAACAA GTTCGATATCAACGAGAATTTCTCCGTTGCTCTG GGCTATTACTATCAGGATGCCAGCTTTGCCTCCTC AGACAATGCAGTGCGTTTGCCAAGTTATTCGCGG TTCGATGGCGGGTTGTTCTATCGATTCGACGAGT TGACACGCGTTCAGCTTAGCGTCGAGAACATTTT CGACAGGCGTTACATCATCAACTCCAACAACAAC AACAACCTCACGCCTGGCGCGCCGAGAACAGTCC GCGTGCAATTGATCGCTCGGTTCTAAA |
| NLS0042 | ref1_86157 | 71 | AGCCCACAAGCCTGATGCACTTAACTACATCCTC TAATGTCGCGCCAATTTGCTTGGCGGCAGGGGAT GTTGTATCGTCATAGGCTTGTCTAACCGGAACTT GTTTGCCAATCTCTTTGGCGATCGCAACCGCCAT CTCGTGTTCGTCAACCATGTGCGCGTTCCTCTAAT TGCACTCATGGTGCCACGTGCACCTCCGATCGTC TCGTGTCTAGAATGAAGGTGGGAACAACCTTACA CAGGCTTTCGCGACGCGCGAATTTCTGGTTTCTCC GCCTCGGATGTGGGTTTGAGCGCTTC |
| NLS0042 | ref1_142469 | 72 | CTTTTCATTTGTCATGATCTCGACCAAGGTATTCA CGGCAAGCTCGGTCTGTTGCTTAGCAAGTGCCTG AACTTCGCGAACGATCGGCTCTCGACCCTTCGGG TTCGAGACCTGTCCCTTTTTGAAAACCACGTGCCC TACACTTTTCGGGATCAAGGTGCGGGTTGGCTTT GGTCAAAATTCTCTGGCGTCCCATTACACGCCCT CCGCATCATCGTTCCCGCGAACGATCTGACCCCC GACTTCCGCGAGGAAGCGTGTGGCGTGATCCTCG AAGCGGAATGCCACCTCGAACTGTTCC |
| NLS0042 | ref1_142321 | 73 | CAGCAGCAAGCAGATCGTTGAAAACCGCTTGAA CCGCATCTTGATCGGGACCGGAACCAATCAGGTC ATCTAGGTAAACCGAGACGTAAACTCGTTTGCGC TCGGCATCTTTCAGAACGTCCGTGATGCCAGACC GCATTAGTACCATCGTCGCCAAGGCGGGCGACTG AACGAAGCCGATCGGCAGAGAGTAACGGGGACC GCCCCTAATCGGGTTGCGAACGCAAGACCACTTA GCAAAGGTTCGAGCACGGCCGAACTTCGCATGGT GGAGAGCCGCGGCAACACGGTTCCGTGATA |
| NLS0064 | ref1_153668 | 74 | TAGACATTCCAACAAACCGGCAAGAGGCTCGTCC TCACTCGAGGATTTGTTGGGACTTGCATGATGTC GAAGCGGAGCCGTTATGACCTGGGTGCGATCATG CGCCGAGCATGGGAGATGGCTCGGGAGGCGGCA TTCGCGGTTGGCGAGCGGGCACGGACTCACCTTG CTGCCGCGATGCGCAGCGCGTGGGCCGAAGCCA AGTTGGCACTCGCGCCCACGAAGACGGAGCAGG ATCGTCTCTCTCCGAGCGACATGATCGGACATGA GGACGCCTACCAAGGCCGGGTTCTAAAATAT |

TABLE 7-continued

| Strain | Fragment | SEQ ID NO | Sequence |
|---|---|---|---|
| NLS0064 | ref1_3842117 | 75 | AAGATGGATACGACAAGCGCGATTACATTATTTG CGAAATAGATGGACAAATAAAAGACAAAGGACT GATGTATTTCCTTAAATCTGGACAAGTTGACCTCT TTCACATAGAAGTCACCACTCCCTTTGGGACAAT TTGGTGTCACGAAAACATAGAGGCCGAACTTCTT AGCTGAATTATCGCGCTCCGGGTTCTTATGCGGC TGAGTGAAGCGCGGGACAGCTTGCGAGCAGGGC CGCCAATGGCAGCCGGGATGACACAATGCTCGGT CTCCCGACGCTTCTTCAATCGGGAGCGCT |
| NLS0064 | ref1_3842278 | 76 | AGCTGAATTATCGCGCTCCGGGTTCTTATGCGGC TGAGTGAAGCGCGGGACAGCTTGCGAGCAGGGC CGCCAATGGCAGCCGGGATGACACAATGCTCGGT CTCCCGACGCTTCTTCAATCGGGAGCGCTTCGCA GCCCGGGGCGGCGCGCTCATGCGTCACGACCTGG GCCCTGCGCACCTTCGCGGCCCCGCCGTCCCGGC AGATCCCTGATGCCCAAGTGGGCGGCCACTCCA TCAAAGAACCCCGGCCTGTGGCAGATCTCGTAGG CATACCGAGGTTCCGCAGTGCCCCACC |
| NLS0109 | ref1_135566 | 77 | ACGGTCACCCCACGGACTGGGCGAGTACCTCACC GGTGTTCTATCATAACGCCGAGTTAGTTTTCGAC CGTCCCTTATGCGATGTACCACCGGTGTCGGCAG CCGATTTCGTCCCACCGGGAGCTGGCGTTCCGGT TCAGACCACCATCATCGGTCACGATGTCTGGATT GGACACGGGGCCTTCATCTCCCCCGGCGTGACTA TAGGAAACGGCGCGATCGTCGGGGCCCAGGCGG TCGTCACAAGAGATGTCCCACCCTATGCGGTAGT TGCTGGCGTCCCCGCGACCGTACGACGAT |
| NLS0109 | ref1_135772 | 78 | CCAATAAAAGCGTTGGCCGCCTGGGCAACCCGAT CCGAGCCTAAGACTCAAAGCGCAAGCGAACACT TGGTAGAGACAGCCCGCCGACTACGGCGTTCCAG CACTCTCCGGCTTTGATCGGATAGGCATTGGTCA AGGTGCCGGTGGTGATGACCTCGCCCGCCGCAAG CGGCGAATTACTCGGATCAGCGGCCAGCACCTCG ACCAAGTGTCGGAGCGCGACCAAAGGGCCACGT TCGAGGACGTTTGAGGCGCGACCAGTCTCGATAG TCTCATCGTCGCGGCGAAGCTGCACCTCGA |
| NLS0109 | ref1_169470 | 79 | CGATGGCACCGACCTGCCATGCCTCTGCCGTCCG CGCCAGAATGGTAAAGAGGACGAAGGGGGTAAG GATCGTCGCTGCAGTGTTGAGCAGCGACCAGAGA AGGGGGCCGAACATCGGCATCAAACCTCGATTGC CACTCGGACGCGAAGCGCGTCTTGAAGGAGGGA TGGAAGCGAAACGGCCGCAGAGTAACCGCCGAC GAAAGATTGCACCCCTCATCGAGCAGGATCGGA GGTGAAGGCAAGCGTGGGTTATTGGTAAGTGCA AAAAATATAATGGTAGCGTCAGATCTAGCGTTC |

REFERENCES

Altschul S. F., Gish W., Miller W., Myers E. W., Lipman D. J. (1990) Basic local alignment search tool. *J. Mol. Biol.* 215:403-410

Bentley D. R., Balasubramanian S., Swerdlow H. P., Smith G. P., Milton J., Brown D. G., Hall K. P., Evers D. J., Barnes C. L., Bignell H. R. et al. (2008) Accurate whole human genome sequencing using reversible terminator chemistry. *Nature* 456:53-59.

Caporaso J. G., Lauber C. L., Walters W. A., Berg-Lyons D., Huntley J., Fierer N., Owens S. M., Betley J., Fraser L., Bauer M., Gormley N., Gilbert J. A., Smith G., Knight R. (2012) Ultra-high-throughput microbial community analysis on the Illumina HiSeq and MiSeq platforms. *ISME J* 6:1621-1624.

Comai et al. (1983) An altered aroA gene product confers resistance to the herbicide glyphosate. *Science* 221 (4608): 370-371.

Green, P. N. 2005. *Methylobacterium*. In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.

Green, P. N. 2006. *Methylobacterium*. In Dworkin, M., S. Falkow, E. Rosenberg, K.-H. Schleifer, and E. Stackebrandt (eds.). "The Prokaryotes. A Handbook on the Biology of Bacteria. Volume 5. Proteobacteria: Alpha and Beta Subclasses." Third edition. Springer, New York. Pages 257-265.

Green and Ardley (2018) Review of the genus *Methylobacterium* and closely related organisms: a proposal that some *Methylobacterium* species be reclassified into a new genus, Methylorubrum gen. nov. International Journal of Systematic and Evolutionary Microbiology 68:2727-2748.

Konstantinidis, K. T. and Tiedje J. M. (2005) *Proc. Nat. Acad. Sci. USA* 102:2567-2572.

Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2. Ecophysiology and biochemistry." Third edition. Springer, New York. Pages 618-634.

Sanger F, Nicklen S, Coulson AR (1977) DNA sequencing with chain-terminating inhibitors. *Proc Natl Acad Sci USA*. 74 (12): 5463-5467

Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. *Jour. Bacteriol*. 183 (1): 214-220.

Vogel, H. J., and D. M. Bonner. 1956. Acetylornithinase of *Escherichia coli*: Partial purification and some properties. J. Biol. Chem. 218:97-106.

Whittenbury, R., S. L. Davies, and J. F. Wilkinson. 1970. Enrichment, isolation and some properties of methane-utilizing bacteria. J. Gen. Microbiol. 61:205-218.

Having illustrated and described the principles of the present disclosure, it should be apparent to persons skilled in the art that the disclosure can be modified in arrangement and detail without departing from such principles.

Although the materials and methods have been described in terms of various embodiments and illustrative examples, it will be apparent to those of skill in the art that variations can be applied to the materials and methods described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A method for improving soybean plant yield that comprises:

(a) applying a composition to a soybean plant or part thereof wherein the composition comprises one or more *Methylobacterium* selected from the group consisting of: NLS0934 (NRRL B-67341), NLS0497 (NRRL B-67925), NLS0693 (NRRL B-67926), NLS1179 (NRRL B-67929), NLS1181 (NRRL B-67927), and NLS0610 (NRRL B-67892); or the composition comprises *Methylobacterium* NLS0109 (NRRL B-67340) and NLS0610 (NRRL B-67892); wherein said composition further comprises at least one additional component selected from the group consisting of an additional active ingredient, an agriculturally acceptable adjuvant, and an agriculturally acceptable excipient; and, (b) growing the soybean plant to maturity, thereby improving yield of the soybean plant.

2. The method of claim 1, wherein the composition is applied to a soybean seed.

3. The method of claim 1 wherein the applied composition coats or partially coats the soybean plant or part thereof.

4. The method of claim 1 wherein the composition is applied to foliage of the soybean plant.

5. The method of claim 1 wherein said composition is applied by spraying, coating, partially coating, immersing, and/or imbibing the soybean plant or plant part with the composition.

6. The method of claim 5, wherein the applied composition coats or partially coats the soybean plant or a part thereof, wherein partial coating includes coating at least 5%, 10%, 20%, 30%, 40%, 50%, 60%, 70%, 80%, 90%, 95%, 98%, 99%, or about 99.5% of the surface area of the soybean plant or a part thereof.

7. The method of claim 1 wherein the composition further comprises *Methylobacterium* isolate NLS0017 (B-50931).

8. The method of claim 1, wherein said composition further comprises an additional active ingredient.

9. The method of claim 8, wherein the additional active ingredient is selected from the group consisting of a fungicide, insecticide, nematicide, and an additional biological.

10. The method of claim 9, wherein the additional biological is a biocontrol agent.

11. The method of claim 9, wherein the additional active ingredient:
  (a) is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane;
  (b) is selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), ISO14 (NRRL B-50942), ISO16 (NRRL B-67340), and variants thereof; and/or
  (c) is a bacterium of the genus Actinomycetes, *Agrobacterium, Arthrobacter, Alcaligenes,* Aureobacterium, Azobacter, *Bacillus, Beijerinckia, Brevibacillus, Burkholderia, Chromobacterium, Clostridium, Clavibacter, Comomonas, Corynebacterium, Curtobacterium, Enterobacter, Flavobacterium, Gluconobacter, Hydrogenophage, Klebsiella, Paenibacillus, Pasteuria,* Phingobacterium, *Photorhabdus, Phyllobacterium, Pseudomonas, Rhizobium, Bradyrhizobium, Serratia, Stenotrophomonas, Variovorax,* or Xenorhabdus.

12. The method of claim 1 wherein said composition is an essentially dry fermentation product having about 5% or less water content.

13. The method of claim 12 wherein said additional component is an agriculturally acceptable excipient selected from the group consisting of woodflours, clays, activated carbon, diatomaceous earth, fine-grain inorganic solids and calcium carbonate.

14. The method of claim 12 wherein said additional component is an agriculturally acceptable adjuvant selected from the group consisting of polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses, methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof.

15. The method of claim 13, wherein said agriculturally acceptable excipient is a clay or inorganic solid selected from the group consisting of calcium bentonite, kaolin, china clay, talc, perlite, mica, vermiculite, silicas, quartz powder, montmorillonite and mixtures thereof.

* * * * *